US012698398B2

(12) United States Patent
Wu et al.

(10) Patent No.: US 12,698,398 B2
(45) Date of Patent: Aug. 4, 2026

(54) ENCAPSULATION OF PALETTE FLAKES WITH NANOSTRUCTURED COPPER OXIDE AS LiDAR REFLECTIVE BLACK PIGMENTS

(71) Applicant: Toyota Motor Engineering & Manufacturing North America, Inc., Plano, TX (US)

(72) Inventors: Songtao Wu, Ann Arbor, MI (US); Debasish Banerjee, Ann Arbor, MI (US); Torin C. Peck, Owosso, MI (US); Cynthia Gazepis Templeman, Canton, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 665 days.

(21) Appl. No.: 18/105,550

(22) Filed: Feb. 3, 2023

(65) Prior Publication Data

US 2024/0263012 A1 Aug. 8, 2024

(51) Int. Cl.
| | |
|---|---|
| *C08K 9/02* | (2006.01) |
| *C09C 1/00* | (2006.01) |
| *C09D 5/33* | (2006.01) |
| *C09D 7/40* | (2018.01) |
| *C09D 7/62* | (2018.01) |

(52) U.S. Cl.
CPC ............ *C09C 1/0021* (2013.01); *C09D 5/004* (2013.01); *C09D 7/62* (2018.01); *C09D 7/70* (2018.01); *C08K 9/02* (2013.01); *C09C 2200/1004* (2013.01); *C09C 2210/10* (2013.01); *C09C 2220/106* (2013.01)

(58) Field of Classification Search
CPC ........ C08K 9/02; C08K 3/40; C09C 2210/10; C09C 1/0021; C09C 2200/1004; C09C 2220/10; C09C 2220/106
USPC ........................................... 523/205
See application file for complete search history.

(56) References Cited

U.S. PATENT DOCUMENTS

| | | | |
|---|---|---|---|
| 5,811,180 A * | 9/1998 | Berdahl .................... | C09D 5/18 |
| | | | 428/921 |
| 8,842,015 B2 | 9/2014 | Scott | |
| 9,683,107 B2 | 6/2017 | Milliken et al. | |
| 9,921,297 B2 | 3/2018 | Jungwirth | |
| 11,118,062 B2 | 9/2021 | Banerjee et al. | |
| 2002/0030742 A1 | 3/2002 | Aman et al. | |
| 2004/0110026 A1* | 6/2004 | Richards ................. | C09D 5/22 |
| | | | 428/917 |
| 2005/0069704 A1* | 3/2005 | Rathschlag ........... | C09C 1/3063 |
| | | | 428/402.24 |

| | | | |
|---|---|---|---|
| 2013/0251771 A1* | 9/2013 | Shimizu ................... | C09D 7/62 |
| | | | 106/459 |
| 2015/0122146 A1 | 5/2015 | Gruner et al. | |
| 2017/0015836 A1 | 1/2017 | Milliken et al. | |
| 2020/0349338 A1 | 11/2020 | Lagmanson | |

FOREIGN PATENT DOCUMENTS

| | | |
|---|---|---|
| CA | 3147350 A1 | 4/2021 |
| CN | 103480377 B | 4/2015 |
| CN | 109270963 A | 1/2019 |
| WO | 2014070116 A1 | 5/2014 |
| WO | 2015153129 A1 | 10/2015 |
| WO | 2020021306 A1 | 1/2020 |

OTHER PUBLICATIONS

Wu, et. al., "Pitch-Black Nanostructured Copper Oxide as an Alternative to Carbon Black for Autonomous Environments", https://doi.org/10.1002/aisy.202100049, Advanced Intelligent Systems, Jun. 29, 2021.

Larson, et. al., "Combustion of CO and Toluene; Characterisation of Copper Oxide Supported on Titania and Activity Comparisons with Supported Cobalt, Iron, and Manganese Oxide" Journal of Catalysis vol. 163, Issue 2, pp. 279 293, https://doi.org/10.1006/jcat.1996.0329, Elsevier, Oct. 1996.

"What is the Working Principle of Reflective Fabric?" Hangzhou Chinastars, https://www.chinareflective.com/faqs/How_does_reflective_fabric_work.html.

"Reflective Strips", Spacio Innovations, https://www.spacioinnovations.com/brilliant.html.

Kim, J.H. et al., "Design of Near Infrared Reflective Effective Pigment for LiDAR Detectable Paint," MRS Advances, vol. 5, Issue 11 (Energy and Environment), Jan. 21, 2020, pp. 515-522 (Abstract only).

International Search Report and Written Opinion for application PCT/US2021/041571 mail date Oct. 15, 2021 (14 pages).

Braga et al: "Copper oxide and niobium pentoxide supported on silica•alumina: Synthesis, characterization, and application on diesel soot oxidation", Journal of Catalysis, Academic Press, Duluth, MN, US, vol. 247, No. 1, Mar. 2, 2007 (Mar. 2, 2007), pp. 68-77, XP005907307, ISSN: 0021-9517, DOI: 10.1016/J.JCAT.2006.12.022.

(Continued)

*Primary Examiner* — Hannah J Pak
(74) *Attorney, Agent, or Firm* — DINSMORE & SHOHL LLP

(57) ABSTRACT

An encapsulated palette flake includes a palette flake having a first surface and a second surface, and a layer on at least one of the first surface and the second surface. A blackness My of the encapsulated palette flake is greater than or equal to 110 and less than or equal to 140. A reflectivity of the encapsulated palette flake in a visible spectrum of electromagnetic radiation that is less than or equal to 10.0%. A reflectivity of the encapsulated palette flake in a near-IR and LiDAR spectrum of electromagnetic radiation that is between 10% and 90%. A method for forming an encapsulated palette flake includes combining a base solution comprising palette flakes and a precipitating agent with a solution comprising a copper source, drying the precipitate, and calcining the dried precipitate. The precipitating agent is selected from sodium hydroxide, sodium carbonate, or ammonium carbonate.

20 Claims, 11 Drawing Sheets

(56) References Cited

OTHER PUBLICATIONS

Akgul Funda Aksoy et al: "Influence of thermal annealing on microstructural, morphological, optical properties and surface electronic structure of copper oxide thin films", Materials Chemistry and Physics, vol. 147, No. 3, Oct. 1, 2014 (Oct. 1, 2014), pp. 987-995, XP055846533, Switzerland, Taiwan, Republic of China ISSN: 0254-0584, DOI: 10.1016/j.matchemphys.2014.06.047.

Sekhar R: "Preparation of copper oxide thin film by the sol-gel-like dip technique and study of their structural and optical properties", Solar Energy Materials and Solar Cells, Elsevier Science Publishers, Amsterdam, NL, vol. 68, No. 3-4, Jun. 1, 2001 (Jun. 1, 2001), pp. 307-312, XP004230572, ISSN: 0927-0248, DOI: 10.1016/S0927-0248(00)00364-0.

Tangale Nilesh Pet al: "Dehydrogenation of cyclohexanol over Cu/Al2O3catalysts prepared with different precipitating agents", Applied Catalysis A: General, Elsevier, Amsterdam, NL, vol. 467, Aug. 18, 2013 (Aug. 18, 2013), pp. 421-429, XP028758172, ISSN: 0926-860X, DOI: 10.1016/J.APCATA.2013.07.063.

Zhang Fan et al: "Effect of Al-containing precursors on Cu/ZnO/Al2O3 catalyst for methanol production", Fuel Processing Technology, vol. 178, Sep. 1, 2018 (Sep. 1, 2018), pp. 148-155, XP055847608, NL ISSN: 0378-3820, DOI: 10.1016/j.fuproc.2018.04.021.

Wu Songtao et al: "Pitch-Black Nanostructured Copper Oxide as an Alternative to Carbon Black for Autonomous Environments", Advanced Intelligent Systems, vol. 3, No. 9, Jun. 29, 2021 (Jun. 29, 2021), p. 2100049, XP055846672, DE ISSN: 2640-4567, DOI: 10.1002/aisy.202100049 Retrieved from the Internet: URL: https: //onlinelibrary.wiley.com/doi/fu11-XML/10.1002/aisy.202100049>.

Prabu R. David, et al: "Studies on copper oxide think films prepared by simple spray technique", Journal of Materials Science: Materials in Electronics, Chapman and Hall, London, GB, vol. 28, No. 9 Jan. 28, 2017 (Jan. 28, 2017), pp. 6754-6762, XPO36212815, ISSN: 0+57--4522, DOI: 10.1007/S10854-017-6371-2 [retrieved on Jan. 28, 2017] figures 2, 7.

Chang Ming-Hui, et al: "Preparation of coper oxide nanoparticles and its application in nanoparticles and its application in nanofluid", Powder Technology, vol. 207, No. 1-3, Dec. 1, 2010 (Dec. 1, 2010)m ages 378-386, xp055962407, Basel (CH) ISSN: 0032-5910, DOI: 10.1016/j. powtec.2010.11.022 p. 379 col. 1, paragraph 2-p. 380, col. 1, paragraph 2-p. 380, col. 1, paragraph 2.2 table 2.

International Search Report and Written Opinion for Application No. PCT/US2022/032693, date of mailing Sep. 27, 2022 (13 pages).

* cited by examiner

ED5 Layered Image 3

2.5 µm

CuLα1,2

2.5 µm

ED5 Layered Image 12

2.5 µm

Cu Lα1,2

10 µm

ENCAPSULATION OF PALETTE FLAKES WITH NANOSTRUCTURED COPPER OXIDE AS LiDAR REFLECTIVE BLACK PIGMENTS

TECHNICAL FIELD

The present specification generally relates to palette flakes encapsulated with particles that reflect near-IR electromagnetic radiation and, more specifically, to palette flakes encapsulated with copper oxide particles that reflect near-IR electromagnetic radiation.

BACKGROUND

Light detecting and ranging (LiDAR) systems using pulsed laser electromagnetic radiation with a wavelength of 905 nanometers (nm) or 1050 nm have been proposed and tested for autonomous vehicle obstacle detection and avoidance systems as well as in other automated detection systems. However, dark colored (e.g., black) pigments used in paints and other materials to provide a dark-colored objects absorb not only visible electromagnetic radiation to provide the dark color, but also absorb near-IR electromagnetic radiation with wavelengths of greater than about 750 nanometers, which includes LiDAR electromagnetic radiation.

Accordingly, a need exists for alternative dark colored pigments that absorb electromagnetic radiation within the visible spectrum, but that reflect near-IR electromagnetic radiation with wavelengths around 905 nm or 1050 nm.

SUMMARY

According to an embodiment, an encapsulated palette flake comprises: a palette flake having a first surface and a second surface; and a layer on at least one of the first surface and the second surface, wherein a blackness My of the encapsulated palette flake is greater than or equal to 110 and less than or equal to 140, a reflectivity of the encapsulated palette flake in a visible spectrum of electromagnetic radiation that is less than or equal to 10.0%, and a reflectivity of the encapsulated palette flake in a near-IR and LiDAR spectrum of electromagnetic radiation that is between 10% and 90%.

According to an embodiment, the palette flake is selected from the group consisting of $TiO_2$ coated glass, $SiO_2$ coated glass, and mica, a copper oxide layer is present on both the first surface and the second surface of the palette flake, the blackness My of the encapsulated palette flake is greater than or equal to 125 and less than or equal to 140, the reflectivity of the encapsulated palette flake in the visible spectrum of electromagnetic radiation is less than or equal to 5.0%, and the reflectivity of the encapsulated palette flake in the near-IR and LiDAR spectrum of electromagnetic radiation is greater than or equal to 60%.

According to an embodiment, a method for forming an encapsulated palette flake comprises: combining a base solution comprising palette flakes and a precipitating agent with a solution comprising a copper source to form a precipitate; drying the precipitate, thereby obtaining dried precipitate; and calcining the dried precipitate to form encapsulated palette flakes, wherein the precipitating agent is selected from the group consisting of sodium hydroxide, sodium carbonate, and ammonium carbonate.

These and additional features provided by the embodiments described herein will be more fully understood in view of the following detailed description in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Crystallites disclosed and described herein display a dark color and reflect near-IR electromagnetic radiation, which includes LiDAR, with wavelengths greater than or equal to 850 nm and less than or equal to 1550 nm. However, when the near-IR or LiDAR-reflecting black crystallites disclosed and described herein are incorporated into paint systems, they tend to form agglomerates on a micrometer scale, which is significantly larger than the hundred nanometer scale of carbon black particles traditionally used in black paint systems. Accordingly, an extremely high loading of near-IR or LiDAR-reflecting black crystallites is required in paint systems to achieve coverage similar to carbon black. Therefore, in embodiments disclosed and described herein, a palette flake is encapsulated with the near-IR or LiDAR-reflecting black crystallite. By encapsulating a palette flake with a near-IR or LiDAR-reflecting black crystallite, the agglomeration of the near-IR or LiDAR-reflecting black crystallites can be reduced and the geometry of the near-IR or LiDAR-reflecting black crystallite within the paint system can be improved. The encapsulated palette flake may then be included in a paint system to form a near-IR and LiDAR-reflecting dark colored paint that can be applied to objects-such as, for example, portions of a vehicle, portions of structures, robots, and the like-so that near-IR and LiDAR detection systems can detect an article coated with the near-IR and LiDAR reflecting dark colored paint.

It should be understood that unless explicitly stated otherwise, the use of the term "crystallites" herein refers to near-IR or LiDAR reflecting black crystallites.

As used herein, the term "near-IR electromagnetic radiation" refers to electromagnetic radiation with wavelengths greater than or equal to 800 nm and less than or equal to 2500 nm, and "LiDAR" refers to electromagnetic radiation with wavelengths greater than or equal to 905 nm and less than or equal to 1550 nm.

As used herein, the term "visible spectrum" refers to electromagnetic radiation with wavelengths greater than or equal to 350 nm and less than or equal to 750 nm.

The near-IR or LiDAR reflecting dark colored paint may be disposed on surfaces to provide a near-IR or LiDAR reflecting dark colored surface. Non-limiting examples include surfaces of vehicle body panels such as vehicle door panels, vehicle quarter panels, and the like. Utilization of the near-IR or LiDAR reflecting palette flakes encapsulated with near-IR or LiDAR reflecting black crystallites allow dark colored objects to be detected with a near-IR or LiDAR system. Various embodiments of palette flakes encapsulated with near-IR or LiDAR-reflecting black crystallites and methods for making and using the same will be described in further detail herein with specific reference to the appended drawings.

Palette Flakes

Figures 1A, 1B:
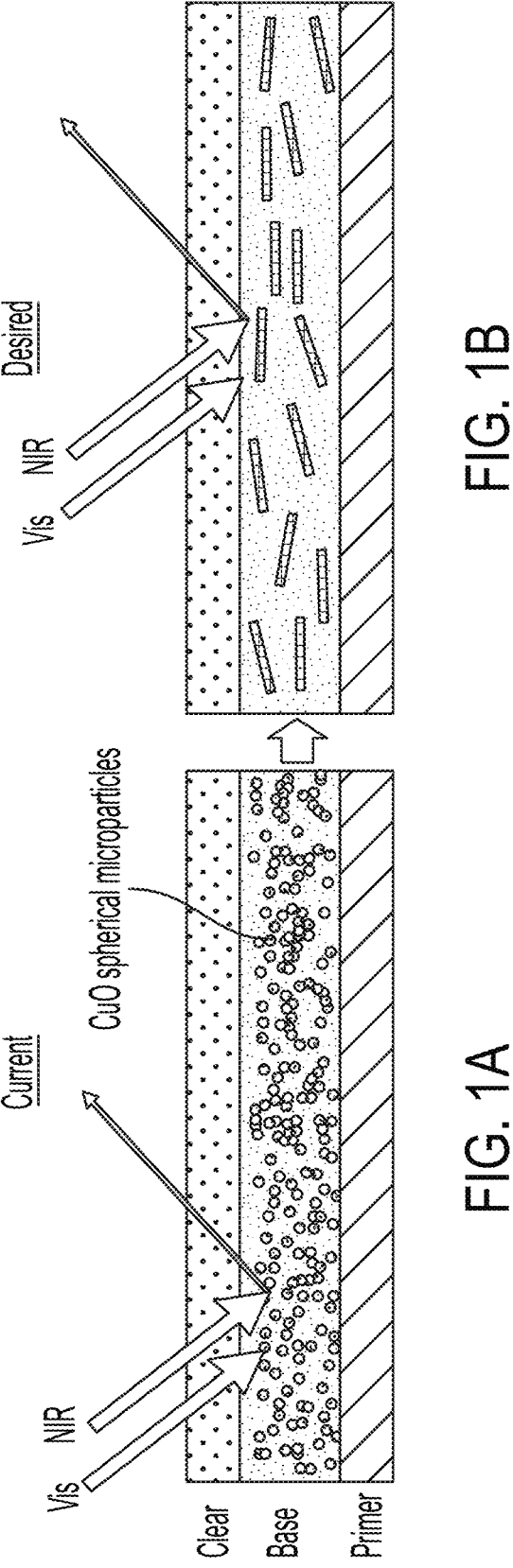
FIG. 1A schematically depicts a paint system comprising copper oxide particles in a base layer.
FIG. 1B schematically depicts a paint system comprising encapsulated palette flakes.

With reference now to FIG. 1A, a paint system 100 with a clear coat layer 110, a base layer 120 comprising near-IR or LiDAR-reflecting black crystallites 121, and a primer layer 130 is schematically depicted. As shown in FIG. 1A the geometrical distribution of the near-IR or LiDAR-reflecting black crystallites 121 in the base layer 120 is arbitrary, and the near-IR or LiDAR-reflecting black crystallites 121 form agglomerates that can be quite large. These issues combine to result in near-IR or LiDAR reflection that is not uniform and electromagnetic radiation that can transmit through the layers of the paint system, such as visible light that passes through the base layer 120 comprising near-IR or LiDAR-reflecting black crystallites 121 and could be reflected out of the paint system. FIG. 1B shows a paint system 100 with a clear coat layer 110, a base layer 120 with near-IR or LiDAR-reflecting black crystallite encapsulated palette flakes 125 in the base layer 120, and a primer layer 130. As shown in FIG. 1B, the near-IR or LiDAR-reflecting black crystallite encapsulated palette flakes 125 are all geometrically oriented in a similar direction and can be added to the base layer 120 in amounts such that LiDAR is uniformly reflected from the paint system 100 and electromagnetic radiation, such as visible light, is not transmitted through the paint system 100. In view of this, by encapsulating palette flakes with LiDAR-reflecting black crystallites, the advantages of using palette flakes in paint systems (both those discussed above and those conventionally known, such as lower cost) can be realized in combination with the LiDAR reflectivity of the LiDAR-reflecting black crystallites.

The composition of the palette flakes is not particularly limited. In embodiments, the palette flake is a titanium dioxide ($TiO_2$) coated glass flake, a silica ($SiO_2$) coated glass flake, or a mica flake. In embodiments, the palette flakes have an average length (measured as the longest length of the palette flake) that is between 1 μm and 100 μm, such as between 5 μm and 100 μm, between 10 μm and 100 μm, between 15 μm and 100 μm, between 20 μm and 100 μm, between 25 μm and 100 μm, between 30 μm and 100 μm, between 40 μm and 100 μm, between 50 μm and 100 μm, between 75 μm and 100 μm, between 90 μm and 100 μm, between 1 μm and 90 μm, between 5 μm and 90 μm, between 10 μm and 90 μm, between 15 μm and 90 μm, between 20 μm and 90 μm, between 25 μm and 90 μm, between 30 μm and 90 μm, between 40 μm and 90 μm, between 50 μm and 90 μm, between 75 μm and 90 μm, between 1 μm and 75 μm, between 5 μm and 75 μm, between 10 μm and 75 μm, between 15 μm and 75 μm, between 20 μm and 75 μm, between 25 μm and 75 μm, between 30 μm and 75 μm, between 40 μm and 75 μm, between 50 μm and 75 μm, between 1 μm and 50 μm, between 5 μm and 50 μm, between 10 μm and 50 μm, between 15 μm and 50 μm, between 20 μm and 50 μm, between 25 μm and 50 μm, between 30 μm and 50 μm, between 40 μm and 50 μm, between 1 μm and 30 μm, between 5 μm and 30 μm, between 10 μm and 30 μm, between 15 μm and 30 μm, between 20 μm and 30 μm, between 25 μm and 30 μm, between 1 μm and 25 μm, between 5 μm and 25 μm, between 10 μm and 25 μm, between 15 μm and 25 μm, between 20 μm and 25 μm, between 1 μm and 20 μm, between 5 μm and 20 μm, between 10 μm and 20 μm, between 15 μm and 20 μm, between 1 μm and 15 μm, between 5 μm and 15 μm, between 10 μm and 15 μm, between 1 μm and 10 μm, between 5 μm and 10 μm, or between 1 μm and 5 μm.

According to embodiments, the aspect ratio of the palette flake (measured as a ratio of length to thickness) is between 10 and 30, such as between 12 and 30, between 15 and 30, between 18 and 30, between 20 and 30, between 22 and 30, between 25 and 30, between 28 and 30, between 10 and 28, between 12 and 28, between 15 and 28, between 18 and 28, between 20 and 28, between 22 and 28, between 25 and 28, between 10 and 25, between 12 and 25, between 15 and 25, between 18 and 25, between 20 and 25, between 22 and 25, between 10 and 22, between 12 and 22, between 15 and 22, between 18 and 22, between 20 and 22, between 10 and 20, between 12 and 20, between 15 and 20, between 18 and 20, between 10 and 18, between 12 and 18, between 15 and 18, between 10 and 15, between 12 and 15, or between 10 and 12.

In embodiments, the palette flakes have a BET surface area that is from 2.0 $m^2$/g to 15.0 $m^2$/g, such as from 4.0 $m^2$/g to 15.0 $m^2$/g, from 6.0 $m^2$/g to 15.0 $m^2$/g, from 8.0 $m^2$/g to 15.0 $m^2$/g, from 10.0 $m^2$/g to 15.0 $m^2$/g, from 12.0 $m^2$/g to 15.0 $m^2$/g, from 2.0 $m^2$/g to 12.0 $m^2$/g, from 4.0 $m^2$/g to 12.0 $m^2$/g, from 6.0 $m^2$/g to 12.0 $m^2$/g, from 8.0 $m^2$/g to 12.0 $m^2$/g, from 10.0 $m^2$/g to 12.0 $m^2$/g, from 2.0

$m^2/g$ to 10.0 $m^2/g$, from 4.0 $m^2/g$ to 10.0 $m^2/g$, from 6.0 $m^2/g$ to 10.0 $m^2/g$, from 8.0 $m^2/g$ to 10.0 $m^2/g$, from 2.0 $m^2/g$ to 8.0 $m^2/g$, from 4.0 $m^2/g$ to 8.0 $m^2/g$, from 6.0 $m^2/g$ to 8.0 $m^2/g$, from 2.0 $m^2/g$ to 6.0 $m^2/g$, from 4.0 $m^2/g$ to 6.0 $m^2/g$, or from 2.0 $m^2/g$ to 4.0 $m^2/g$.

In one or more embodiments, the palette flakes have a total pore volume (at $P/P_o$ approximately equal to 0.95) that is from 0.010 $cm^3/g$ to 0.020 $cm^3/g$, such as from 0.012 $cm^3/g$ to 0.020 $cm^3/g$, from 0.014 $cm^3/g$ to 0.020 $cm^3/g$, from 0.016 $cm^3/g$ to 0.020 $cm^3/g$, from 0.018 $cm^3/g$ to 0.020 $cm^3/g$, from 0.010 $cm^3/g$ to 0.018 $cm^3/g$, from 0.012 $cm^3/g$ to 0.018 $cm^3/g$, from 0.014 $cm^3/g$ to 0.018 $cm^3/g$, from 0.016 $cm^3/g$ to 0.018 $cm^3/g$, from 0.010 $cm^3/g$ to 0.016 $cm^3/g$, from 0.012 $cm^3/g$ to 0.016 $cm^3/g$, from 0.014 $cm^3/g$ to 0.016 $cm^3/g$, from 0.010 $cm^3/g$ to 0.014 $cm^3/g$, from 0.012 $cm^3/g$ to 0.014 $cm^3/g$, or from 0.010 $cm^3/g$ to 0.012 $cm^3/g$.

In embodiments, the palette flakes have an average pore diameter that is from 10.0 nm to 15.0 nm, such as from 10.5 nm to 15.0 nm, from 11.0 nm to 15.0 nm, from 11.5 nm to 15.0 nm, from 12.0 nm to 15.0 nm, from 12.5 nm to 15.0 nm, from 13.0 nm to 15.0 nm, from 13.5 nm to 15.0 nm, from 14.0 nm to 15.0 nm, from 14.5 nm to 15.0 nm, from 10.0 nm to 14.5 nm, from 10.5 nm to 14.5 nm, from 11.0 nm to 14.5 nm, from 11.5 nm to 14.5 nm, from 12.0 nm to 14.5 nm, from 12.5 nm to 14.5 nm, from 13.0 nm to 14.5 nm, 13.5 nm to 14.5 nm, from 14.0 nm to 14.5 nm, from 10.0 nm to 14.0 nm, from 10.5 nm to 14.0 nm, from 11.0 nm to 14.0 nm, from 11.5 nm to 14.0 nm, from 12.0 nm to 14.0 nm, from 12.5 nm to 14.0 nm, from 13.0 nm to 14.0 nm, from 13.5 nm to 14.0 nm, from 10.0 nm to 13.5 nm, from 10.5 nm to 13.5 nm, from 11.0 nm to 13.5 nm, from 11.5 nm to 13.5 nm, from 12.0 nm to 13.5 nm, from 12.5 nm to 13.5 nm, from 13.0 nm to 13.5 nm, from 10.0 nm to 13.0 nm, from 10.5 nm to 13.0 nm, from 11.0 nm to 13.0 nm, from 11.5 nm to 13.0 nm, from 12.0 nm to 13.0 nm, from 12.5 nm to 13.0 nm, from 10.0 nm to 12.5 nm, from 10.5 nm to 12.5 nm, from 11.0 nm to 12.5 nm, from 11.5 nm to 12.5 nm, from 12.0 nm to 12.5 nm, from 10.0 nm to 12.0 nm, from 10.5 nm to 12.0 nm, from 11.0 nm to 12.0 nm, from 11.5 nm to 12.0 nm, from 10.0 nm to 11.5 nm, from 10.5 nm to 11.5 nm, from 11.0 nm to 11.5 nm, from 10.0 nm to 11.0 nm, from 10.5 nm to 11.0 nm, or from 10.0 nm to 10.5 nm.

To measure the average pore diameter, full adsorption/desorption isotherms were collected over powdered samples, after degassing at 90° C. for one hour, and then to 150° C. for three hours. The isotherms were collected using nitrogen physisorption at 76 K to obtain the specific surface area (SSA) of the materials, by fitting 13 points collected from $P/P_0 \approx 0.06$-0.3 to the Brunauer-Emmett-Teller (BET) equation. Additional adsorption points were collected at various $P/P_0$, up to $P/P_0 \approx 0.95$, followed by desorption back to $P/P_0 \approx 0.06$. The total pore volume was determined by the volume of nitrogen adsorbed at $P/P_0$ 0.95, and average pore diameter was calculated using the Barrett Joyner Halenda (BJH) method.

Near-IR or LiDAR-Reflecting Black Materials

Palette flakes disclosed and described above are encapsulated with near-IR or LiDAR-reflecting black material form near-IR or LiDAR-reflecting encapsulated palette flakes (also referred to herein as an "encapsulated palette flake"). The near-IR or LiDAR-reflecting black material used to encapsulate the palette flakes will now be described.

One difficulty in forming dark-colored (such as black) materials and paint systems that reflect LiDAR or near-IR electromagnetic radiation is the close proximity of the visible spectrum of electromagnetic radiation and near-IR electromagnetic radiation or LiDAR. Materials that provide a dark color, such as black, do not reflect electromagnetic radiation within the visible spectrum of electromagnetic radiation. Such materials will generally also not reflect electromagnetic radiation just outside of the visible spectrum of electromagnetic radiation, such as near-IR and LiDAR electromagnetic radiation. Carbon black is one such material that is commonly used as a dark pigment and that does not reflect electromagnetic radiation in the visible spectrum and that also does not reflect near-IR or LiDAR electromagnetic radiation. Accordingly, a material that does not reflect electromagnetic radiation within the visible spectrum but that does reflect near-IR or LiDAR electromagnetic radiation is required to have a very sharp increase in reflectivity just outside of the visible spectrum of electromagnetic radiation.

Figure 2A:
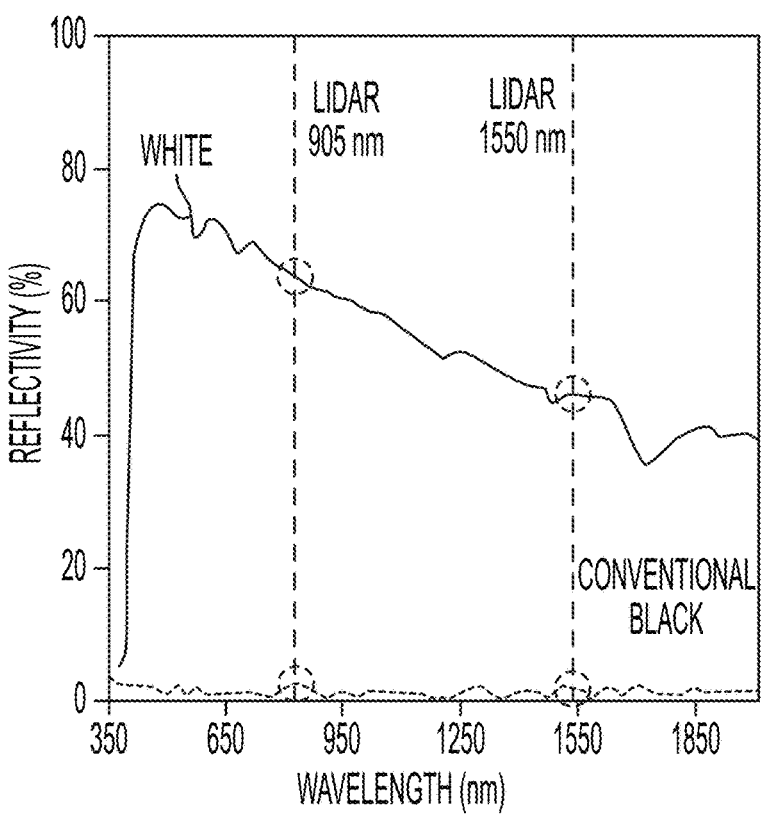
FIG. 2A graphically depicts the reflectivity versus wavelength of electromagnetic radiation for conventional colorants.

With reference now to FIG. 2A, the reflectivity of materials that are commonly used as colorants in a paint system are shown. The percentage of reflectivity is presented along the y-axis of FIG. 2A and the wavelength of the electromagnetic radiation is provided along the x-axis of FIG. 2A. The reflectivity of a conventional black colorant, such as carbon black, is shown along the bottom of the graph. As shown in FIG. 2A, the carbon black colorant does not reflect electromagnetic radiation in the visible spectrum (to the left of the graph). Namely, the reflection of this black colorant is near zero percent within the visible spectrum of electromagnetic radiation. This indicates that the colorant provides a dark, nearly pure black color. However, this conventional colorant also reflects around zero percent of electromagnetic radiation outside of the visible spectrum (to the right on the graph), such as near-IR electromagnetic radiation or LiDAR electromagnetic radiation (e.g., from greater than about 750 nanometers (nm) to about 1550 nm). Similarly, near the top of the graph is shown the reflectivity of white $TiO_2$, which is used as a conventional white colorant. As shown in FIG. 2A, white $TiO_2$ reflects near-IR and LiDAR electromagnetic radiation as shown on the right side of the graph (e.g., from greater than about 750 nm to 1550 nm) where the reflection of near-IR and LiDAR electromagnetic radiation is greater than forty percent (at 1550 nm), and around sixty percent (at 905 nm). However, white $TiO_2$, as the name indicates, also reflects electromagnetic radiation within the visible spectrum. As shown in FIG. 2A, white $TiO_2$ reflects nearly eighty percent of electromagnetic radiation within the visible spectrum. Accordingly, neither of these colorants—carbon black or white $TiO_2$—are suitable as a dark-colored particle that also reflects near-IR or LiDAR electromagnetic radiation.

Figure 2B:
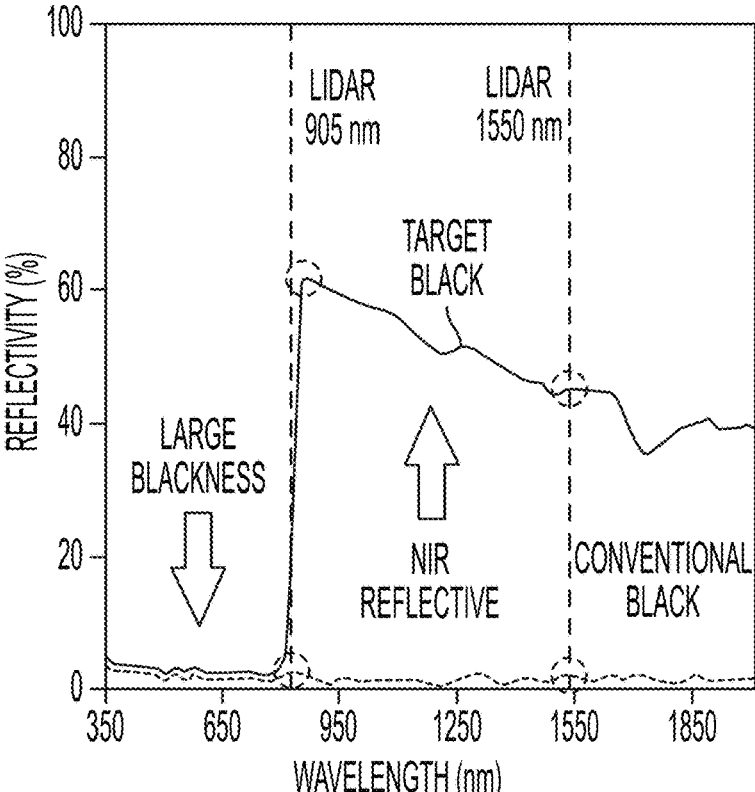
FIG. 2B graphically depicts the reflectivity versus wavelength of electromagnetic radiation for colorants.

FIG. 2B is a graph showing the target conditions of a material that does not reflect light in the visible spectrum of electromagnetic radiation, but that does reflect near-IR and LiDAR electromagnetic radiation. In FIG. 2B, the percentage of reflectivity is measured along the y-axis and the wavelength of electromagnetic radiation is provided along the x-axis. Along the bottom of the graph is shown the reflectivity of a conventional black colorant, which is identical to the reflectivity of the conventional black colorant (such as carbon black) shown in FIG. 2B. As shown in FIG. 2B, materials that do not reflect electromagnetic within the visible spectrum and that reflect near-IR and LiDAR electromagnetic radiation have at least two distinct regions of reflection. The first region of reflection is within the visible spectrum of electromagnetic radiation, indicated on the left side of the graph in FIG. 2B. In this region of reflection, materials that do not reflect electromagnetic within the visible spectrum and that reflect near-IR and LiDAR electromagnetic radiation will behave the same as conventional black colorants (such as carbon black) by not reflecting electromagnetic radiation within the visible spectrum. As shown in FIG. 2B, materials that do not reflect electromagnetic within the visible spectrum and that reflect near-IR and LiDAR electromagnetic radiation reflect nearly zero percent of electromagnetic radiation within the visible spectrum. However, materials that do not reflect electromagnetic within the visible spectrum and that reflect near-IR and LiDAR electromagnetic radiation have a second region of reflection that is outside of the visible spectrum of electromagnetic radiation.

The second region of reflection encompasses electromagnetic radiation with wavelengths greater than or equal to 750 nm and less than or equal to 1050 nm (which includes near-IR and LiDAR electromagnetic radiation). In the second region of reflection, the materials that do not reflect electromagnetic within the visible spectrum and that reflect near-IR and LiDAR electromagnetic radiation perform similarly as white $TiO_2$ by reflecting a high amount of electromagnetic radiation within the second region of reflection. As shown in FIG. 2B, materials that do not reflect electromagnetic within the visible spectrum and that reflect near-IR and LiDAR electromagnetic radiation reflect, for example, about sixty percent of LiDAR electromagnetic radiation having a wavelength of 905 nm and reflects greater than forty percent of LiDAR electromagnetic radiation having a wavelength of 1550 nm. By having reflectance in the second region of reflection that is similar to white $TiO_2$, materials can reflect a sufficient amount of near-IR and LiDAR electromagnetic radiation such that the materials can be detected by LiDAR systems.

FIG. 2B shows the difficulty in forming materials that do not reflect electromagnetic within the visible spectrum and that reflect near-IR and LiDAR electromagnetic radiation. Particularly, FIG. 2B shows a steep increase in reflectance just outside of the visible spectrum of electromagnetic radiation. In embodiments, this steep increase of reflectance is present at a wavelength of electromagnetic radiation that is at or about 905 nm, which is a wavelength of electromagnetic radiation commonly used in LiDAR systems. As shown in FIG. 2B, the reflectance increases from about zero percent to nearly sixty percent at a wavelength of electromagnetic radiation that is about 905 nm. Forming materials with such a precise and steep increase in reflectance is difficult to achieve and there is very little room for error. For instance, if the material reflects too much electromagnetic radiation within the visible spectrum, the appearance of the color will not be pure black, but will have hints of, for example, red or purple. However, if the material does not reflect a sufficient amount of near-IR or LiDAR electromagnetic radiation, the material will not be suitable for detection by LiDAR systems.

Without being bound by any particular theory, it is believed that the sharp transition of reflectivity (or absorbance) between 700 nm wavelength and 905 nm wavelength electromagnetic radiation is attributed to the near unity ratio of (−111)/(111) crystal facets and at a crystal size around 100 Å for the (−111) plane.

One material of interest for black color applications is Copper (II) oxide or cupric oxide (CuO). CuO is a common inorganic compound that is a black-colored solid material in its natural state. However, not all copper oxides have this black color. Namely, another stable oxide of copper is cuprous oxide ($Cu_2O$) that is a red solid in its natural state. Therefore, the oxidation state of copper is important to ensure that the material has a black color. CuO is a product of copper mining and it is a precursor to many other copper-containing products and chemical compounds. CuO has been used as a black pigment in certain applications, such as in ceramics, glazes, and the like. However, commonly used CuO does not reflect near-IR or LiDAR electromagnetic radiation. That is, CuO in its natural state behaves much like carbon black in that it does not reflect electromagnetic radiation in the visible spectrum and it also does not reflect electromagnetic radiation in the near-IR or LiDAR spectrum. Without being bound to any particular theory, CuO has a band gap of 2.0 eV that, as described in more detail below, does not readily reflect electromagnetic radiation in the near-IR or LiDAR spectrum. When manipulating CuO to have a band gap that is more amenable to reflecting electromagnetic radiation in the near-IR or LiDAR spectrum, the color of the CuO degrades to a brownish black, which is not suitable for certain applications, such as in an automotive paint, textiles, and the like.

The band gap generally refers to the energy difference (in electron volts or eV) between the top of the valence band (VB) and the bottom of the conduction band (CB). The VB is the band of electron orbitals that electrons can jump out of, moving into the CB when excited. The VB is the outermost electron orbital of an atom that electrons can actually occupy. The band gap is the energy required for an electron to move from the VB to the CB and can be indicative of the electrical conductivity of the material. In optics, the band gap correlates to the threshold where photons can be absorbed by a material. Therefore, without begin bound by any particular theory, the band gap determines what portion of the electromagnetic spectrum the material can absorb. Generally, a material with a large band gap will absorb a greater portion of electromagnetic spectra having a short wavelength, and a material with a small band gap will absorb a greater portion of electromagnetic spectra having long wavelengths. Put differently, a large band gap means that a lot of energy is required to excite valence electrons to the CB. In contrast, when the valence band and conduction band overlap as they do in metals, electrons can readily jump between the two bands, which means that the material is highly conductive. However, it has been found that by manipulating the band gap of a material, the types of electromagnetic spectra that are absorbed by the material may be controlled. In view of this, materials with bandgap energy near the LiDAR detection electromagnetic radiation wavelength (around 905 nm) have a band gap around 1.37 eV and sharp transition at the visible edge (around 700 nm) and are promising candidates as materials that do not reflect visible electromagnetic radiation but that do reflect near-IR and LiDAR electromagnetic radiation.

Generally, a band gap of from 1.2 eV to 1.8 eV is required for a compound to absorb (i.e., not reflect) electromagnetic radiation in the visible spectrum and reflect electromagnetic radiation in the near-IR and LiDAR spectrum. Without manipulation, bulk CuO does not meet these requirements. Bulk CuO has a reported band gap of 2.0 eV and a blackness My value of 128. This band gap is outside of the 1.2 eV to 1.8 eV required to reflect electromagnetic radiation in the near-IR and LiDAR spectrum. Further, as noted above with reference to FIG. 2, a blackness of 128 is significantly lower than the blackness of ~135 for carbon black. Accordingly, in embodiments disclosed and described herein, methods for forming CuO crystallites having significantly reduced particle sizes that result in a decrease the bandgap and increase in the blackness of CuO are provided.

In embodiments, a synthesis of a type of CuO crystallites (also referred to herein as "N—CuO-A") that may be used as a replacement for carbon black and show superior blackness in the visible spectrum of electromagnetic radiation while also having high reflectivity in near-IR and LiDAR electromagnetic radiation wavelengths are provided. The N—CuO-A may, in embodiments, be synthesized via scalable precipitation-pyrolysis method—with proper selection in precipitating agents at certain concentration ranges—that is followed by a well-defined sintering process. Structural and chemical composition studies depict the evolution from precursor to extracted precipitates, and to final CuO crystallites at various process stages.

A CuO material obtained from the precursor $Cu(NO_3)_2$ with $Na_2CO_3$ alkaline based aqueous solution is used to form N—CuO-A. N—CuO-A is prepared following the sintering conditions in a conventional oven (300° C. for 3 hours).

Accordingly, in embodiments, the ratio of (−111)/(111) of N—CuO-A may be greater than or equal to 0.8 and less than or equal to 1.3, such as greater than or equal to 0.9 and less than or equal to 1.3, greater than or equal to 1.0 and less than or equal to 1.3, greater than or equal to 1.1 and less than or equal to 1.3, greater than or equal to 1.2 and less than or equal to 1.3, greater than or equal to 0.8 and less than or equal to 1.2, greater than or equal to 0.9 and less than or equal to 1.2, greater than or equal to 1.0 and less than or equal to 1.2, greater than or equal to 1.1 and less than or equal to 1.2, greater than or equal to 0.8 and less than or equal to 1.1, greater than or equal to 0.9 and less than or equal to 1.1, greater than or equal to 1.0 and less than or equal to 1.1, greater than or equal to 0.8 and less than or equal to 1.0, greater than or equal to 0.9 and less than or equal to 1.0, or greater than or equal to 0.8 and less than or equal to 0.9.

By reducing the size of CuO particles, such as to the average particle sizes disclosed below, the band gap of the CuO decreases. In embodiments, the band gap as measured by X-ray photoelectron spectroscopy (XPS) of the CuO nanoparticles is greater than or equal to 1.2 eV and less than or equal to 1.8 eV, such as greater than or equal to 1.3 eV and less than or equal to 1.8 eV, greater than or equal to 1.4 eV and less than or equal to 1.8 eV, greater than or equal to 1.5 eV and less than or equal to 1.8 eV, greater than or equal to 1.6 eV and less than or equal to 1.8 eV, greater than or equal to 1.7 eV and less than or equal to 1.8 eV, is greater than or equal to 1.2 eV and less than or equal to 1.7 eV, such as greater than or equal to 1.3 eV and less than or equal to 1.7 eV, greater than or equal to 1.4 eV and less than or equal to 1.7 eV, greater than or equal to 1.5 eV and less than or equal to 1.7 eV, greater than or equal to 1.6 eV and less than or equal to 1.7 eV, greater than or equal to 1.2 eV and less than or equal to 1.6 eV, such as greater than or equal to 1.3 eV and less than or equal to 1.6 eV, greater than or equal to 1.4 eV and less than or equal to 1.6 eV, greater than or equal to 1.5 eV and less than or equal to 1.6 eV, greater than or equal to 1.2 eV and less than or equal to 1.5 eV, such as greater than or equal to 1.3 eV and less than or equal to 1.5 eV, greater than or equal to 1.4 eV and less than or equal to 1.5 eV, greater than or equal to 1.2 eV and less than or equal to 1.4 eV, such as greater than or equal to 1.3 eV and less than or equal to 1.4 eV, or greater than or equal to 1.2 eV and less than or equal to 1.3 eV.

Materials such as N—CuO-A have a blackness that is similar to carbon black, but also reflect a significant amount of near-IR and LiDAR electromagnetic radiation. However, as mentioned above, these materials tend to agglomerate into micrometer-scale particles. Moreover, the geometric alignment of these particles within a paint system is arbitrary, as discussed above. Accordingly, the present disclosure provides palette flakes encapsulated with copper oxide materials similar to N—CuO-A, which provides the positive attributes of a palette flake but also reflects near-IR and LiDAR electromagnetic radiation.

Encapsulating Palette Flakes with Near-IR and LiDAR-Reflecting Black Crystallites As noted above, there are benefits using palette flake structures in systems, such as paint systems, and encapsulating palette flakes with near-IR and LiDAR-reflecting black materials provides the benefits palette flakes and the near-IR and LiDAR-reflecting black materials in one combined structure. However, solid phase physical mixing of the CuO particles and palette flakes will not yield homogeneously distributed crystallites on the surfaces of the palette flakes. Moreover, it is known to be difficult to apply near-IR and LiDAR-reflecting black materials to $TiO_2$ palette flakes surfaces. Therefore, other processes for producing palette flakes encapsulated by near-IR and LiDAR-reflecting black materials are necessary.

According to embodiments, wet chemical processes, such as precipitation, can meet the above requirements, but a challenge of using wet chemical processes to make encapsulated palette flakes is to prevent the nucleation of copper precipitates, which can occur if the concentration of the precipitate is high. Nucleated precipitates remain discrete from the surface, such as a $TiO_2$ surface, of the palette flake rather than forming the desired encapsulation of the flake, which can leave portions of the palette flake surface exposed to visible light and cause the reflection of visible light. Therefore, in embodiments, maintaining low local concentrations of the precipitates is desired.

Methods for forming palette flakes encapsulated with copper oxide will now be described.

According to one or more embodiments, a solution of palette flakes in water is first prepared. The concentration of palette flakes is greater than or equal to 50 grams per liter (g/l) and less than or equal to 150 g/l, such as greater than or equal to 70 g/l and less than or equal to 150 g/l, greater than or equal to 75 g/l and less than or equal to 150 g/l, greater than or equal to 90 g/l and less than or equal to 150 g/l, greater than or equal to 100 g/l and less than or equal to 150 g/l, greater than or equal to 110 g/l and less than or equal to 150 g/l, greater than or equal to 125 g/l and less than or equal to 150 g/l, greater than or equal to 130 g/l and less than or equal to 150 g/l, greater than or equal to 50 g/l and less than or equal to 130 g/l, greater than or equal to 70 g/l and less than or equal to 130 g/l, greater than or equal to 75 g/l and less than or equal to 130 g/l, greater than or equal to 90 g/l and less than or equal to 130 g/l, greater than or equal to 100 g/l and less than or equal to 130 g/l, greater than or equal to 110 g/l and less than or equal to 130 g/l, greater than or equal to 125 g/l and less than or equal to 130 g/l, greater than or equal to 50 g/l and less than or equal to 125 g/l, greater than or equal to 70 g/l and less than or equal to 125 g/l, greater than or equal to 75 g/l and less than or equal to 125 g/l, greater than or equal to 90 g/l and less than or equal to 125 g/l, greater than or equal to 100 g/l and less than or equal to 125 g/l, greater than or equal to 110 g/l and less than or equal to 125 g/l, greater than or equal to 50 g/l and less than or equal to 110 g/l, greater than or equal to 70 g/l and less than or equal to 110 g/l, greater than or equal to 75 g/l and less than or equal to 110 g/l, greater than or equal to 90 g/l and less than or equal to 110 g/l, greater than or equal to 100 g/l and less than or equal to 110 g/l, greater than or equal to 50 g/l and less than or equal to 100 g/l, greater than or equal to 70 g/l and less than or equal to 100 g/l, greater than or equal to 75 g/l and less than or equal to 100 g/l, greater than or equal to 90 g/l and less than or equal to 100 g/l, greater than or equal to 50 g/l and less than or equal to 90 g/l, greater than or equal to 70 g/l and less than or equal to 90 g/l, greater than or equal to 75 g/l and less than or equal to 90 g/l, greater than or equal to 50 g/l and less than or equal to 75 g/l, greater than or equal to 70 g/l and less than or equal to 75 g/l, or greater than or equal to 50 g/l and less than or equal to 70 g/l.

Separately, a base solution comprising a precipitating agent, such as sodium carbonate ($Na_2CO_3$) or sodium hydroxide, and water is prepared. The concentration of the precipitating agent in the solution is, according to embodiments, greater than or equal to 50 g/l and less than or equal to 100 g/l, such as greater than or equal to 60 g/l and less than or equal to 100 g/l, greater than or equal to 70 g/l and less than or equal to 100 g/l, greater than or equal to 80 g/l and less than or equal to 100 g/l, greater than or equal to 90 g/l and less than or equal to 100 g/l, greater than or equal to 50 g/l and less than or equal to 100 g/l, greater than or equal to 60 g/l and less than or equal to 100 g/l, greater than or equal to 70 g/l and less than or equal to 100 g/l, greater than or equal to 80 g/l and less than or equal to 100 g/l, greater than or equal to 90 g/l and less than or equal to 100 g/l, greater than or equal to 50 g/l and less than or equal to 90 g/l, greater than or equal to 60 g/l and less than or equal to 90 g/l, greater than or equal to 70 g/l and less than or equal to 90 g/l, greater than or equal to 80 g/l and less than or equal to 90 g/l, greater than or equal to 50 g/l and less than or equal to 80 g/l, greater than or equal to 60 g/l and less than or equal to 80 g/l, greater than or equal to 70 g/l and less than or equal to 80 g/l, greater than or equal to 50 g/l and less than or equal to 70 g/l, greater than or equal to 60 g/l and less than or equal to 70 g/l, and greater than or equal to 50 g/l and less than or equal to 60 g/l.

The base solution is slowly added to the solution of palette flakes with stirring to provide a precipitating solution.

Separately from the precipitating solution, a water-soluble copper source—such as copper nitrate ($Cu(NO_3)_2$), copper sulfate ($CuSO_4$), copper chloride ($CuCl_2$), and copper acetate ($Cu(Ch_3COO)_2$)—is dissolved in water to form a copper source solution. In embodiments, the concentration of the water-soluble copper source in the solution is greater than or equal to 100 g/l and less than or equal to 200 g/l, such as greater than or equal to 110 g/l and less than or equal to 200 g/l, greater than or equal to 120 g/l and less than or equal to 200 g/l, greater than or equal to 130 g/l and less than or equal to 200 g/l, greater than or equal to 140 g/l and less than or equal to 200 g/l, greater than or equal to 150 g/l and less than or equal to 200 g/l, greater than or equal to 160 g/l and less than or equal to 200 g/l, greater than or equal to 170 g/l and less than or equal to 200 g/l, greater than or equal to 180 g/l and less than or equal to 200 g/l, greater than or equal to 190 g/l and less than or equal to 200 g/l, greater than or equal to 100 g/l and less than or equal to 190 g/l, greater than or equal to 110 g/l and less than or equal to 190 g/l, greater than or equal to 120 g/l and less than or equal to 190 g/l, greater than or equal to 130 g/l and less than or equal to 190 g/l, greater than or equal to 140 g/l and less than or equal to 190 g/l, greater than or equal to 150 g/l and less than or equal to 190 g/l, greater than or equal to 160 g/l and less than or equal to 190 g/l, greater than or equal to 170 g/l and less than or equal to 190 g/l, greater than or equal to 180 g/l and less than or equal to 190 g/l, greater than or equal to 100 g/l and less than or equal to 180 g/l, greater than or equal to 110 g/l and less than or equal to 180 g/l, greater than or equal to 120 g/l and less than or equal to 180 g/l, greater than or equal to 130 g/l and less than or equal to 180 g/l, greater than or equal to 140 g/l and less than or equal to 180 g/l, greater than or equal to 150 g/l and less than or equal to 180 g/l, greater than or equal to 160 g/l and less than or equal to 180 g/l, greater than or equal to 170 g/l and less than or equal to 180 g/l, greater than or equal to 100 g/l and less than or equal to 170 g/l, greater than or equal to 110 g/l and less than or equal to 170 g/l, greater than or equal to 120 g/l and less than or equal to 170 g/l, greater than or equal to 130 g/l and less than or equal to 170 g/l, greater than or equal to 140 g/l and less than or equal to 170 g/l, greater than or equal to 150 g/l and less than or equal to 170 g/l, greater than or equal to 160 g/l and less than or equal to 170 g/l, greater than or equal to 100 g/l and less than or equal to 160 g/l, greater than or equal to 110 g/l and less than or equal to 160 g/l, greater than or equal to 120 g/l and less than or equal to 160 g/l, greater than or equal to 130 g/l and less than or equal to 160 g/l, greater than or equal to 140 g/l and less than or equal to 160 g/l, greater than or equal to 150 g/l and less than or equal to 160 g/l, greater than or equal to 100 g/l and less than or equal to 150 g/l, greater than or equal to 110 g/l and less than or equal to 150 g/l, greater than or equal to 120 g/l and less than or equal to 150 g/l, greater than or equal to 130 g/l and less than or equal to 150 g/l, greater than or equal to 140 g/l and less than or equal to 150 g/l, greater than or equal to 100 g/l and less than or equal to 140 g/l, greater than or equal to 110 g/l and less than or equal to 140 g/l, greater than or equal to 120 g/l and less than or equal to 140 g/l, greater than or equal to 130 g/l and less than or equal to 140 g/l, greater than or equal to 100 g/l and less than or equal to 130 g/l, greater than or equal to 110 g/l and less than or equal to 130 g/l, greater than or equal to 120 g/l and less than or equal to 130 g/l, greater than or equal to 100 g/l and less than or equal to 120 g/l, greater than or equal to 110 g/l and less than or equal to 120 g/l, or greater than or equal to 100 g/l and less than or equal to 110 g/l.

The copper source solution is slowly added to the precipitating solution and stirred for a duration that is greater than or equal to 0.5 hours and less than or equal to 2.0 hours, such as greater than or equal to 1.0 hour and less than or equal to 2.0 hours, greater than or equal to 1.5 hours and less than or equal to 2.0 hours, greater than or equal to 0.5 hours and less than or equal to 1.5 hours, greater than or equal to 1.0 hours and less than or equal to 1.5 hours, or greater than or equal to 0.5 hours and less than or equal to 1.0 hour. After the mixture has been stirred for the duration, is aged. The combination of the copper source solution and the precipitating solution is referred to hereinafter as the encapsulating solution.

After aging, the precipitate is collected from the solution, such as by vacuum filtration, or the like. The precipitate is dried at a temperature that is greater than or equal to 100° C. and less than or equal to 150° C., greater than or equal to 110° C. and less than or equal to 150° C., greater than or equal to 120° C. and less than or equal to 150° C., greater than or equal to 125° C. and less than or equal to 150° C., greater than or equal to 130° C. and less than or equal to 150° C., greater than or equal to 140° C. and less than or equal to 150° C., greater than or equal to 100° C. and less than or equal to 140° C., greater than or equal to 110° C. and less than or equal to 140° C., greater than or equal to 120° C. and less than or equal to 140° C., greater than or equal to 125° C. and less than or equal to 140° C., greater than or equal to 130° C. and less than or equal to 140° C., greater than or equal to 100° C. and less than or equal to 130° C., greater than or equal to 110° C. and less than or equal to 130° C., greater than or equal to 120° C. and less than or equal to 130° C., greater than or equal to 125° C. and less than or equal to 130° C., greater than or equal to 100° C. and less than or equal to 125° C., greater than or equal to 110° C. and less than or equal to 125° C., greater than or equal to 120° C. and less than or equal to 125° C., greater than or equal to 100° C. and less than or equal to 120° C., greater than or equal to 110° C. and less than or equal to 120° C., or greater than or equal to 100° C. and less than or equal to 110° C.

The ramp rate for the drying is greater than or equal to 2° C. per minute, such as greater than or equal to 2.5° C. per minute, greater than 3.0° C. per minute, or greater than 3.5° C. per minute.

The precipitate is dried for a duration that is greater than or equal to 2 hours, such as greater than or equal to 4 hours, greater than or equal to 6 hours, greater than or equal to 8 hours, greater than or equal to 10 hours, or greater than or equal to 12 hours.

After the precipitate is dried, the dried precipitate is ground and calcined at a temperature that is greater than or equal to 200° C. and less than or equal to 500° C., such as greater than or equal to 250° C. and less than or equal to 500° C., greater than or equal to 300° C. and less than or equal to 500° C., greater than or equal to 350° C. and less than or equal to 500° C., greater than or equal to 400° C. and less than or equal to 500° C., greater than or equal to 450° C. and less than or equal to 500° C., greater than or equal to 200° C. and less than or equal to 450° C., greater than or equal to 250° C. and less than or equal to 450° C., greater than or equal to 300° C. and less than or equal to 450° C., greater than or equal to 350° C. and less than or equal to 450° C., greater than or equal to 400° C. and less than or equal to 450° C., greater than or equal to 200° C. and less than or equal to 400° C., greater than or equal to 250° C. and less than or equal to 400° C., greater than or equal to 300° C. and less than or equal to 400° C., greater than or equal to 350° C. and less than or equal to 400° C., greater than or equal to 200° C. and less than or equal to 350° C., greater than or equal to 250° C. and less than or equal to 350° C., greater than or equal to 300° C. and less than or equal to 350° C., greater than or equal to 200° ° C. and less than or equal to 300° C., greater than or equal to 250° C. and less than or equal to 300° C., or greater than or equal to 200° C. and less than or equal to 250° C.

The ramp rate for the calcining is greater than or equal to 4° C. per minute, such as greater than or equal to 5° C. per minute, greater than 6° C. per minute, or greater than 7° C. per minute.

The precipitate is calcined for a duration that is greater than or equal to 2 hours, such as greater than or equal to 3 hours, greater than or equal to 5 hours, greater than or equal to 8 hours, greater than or equal to 10 hours, or greater than or equal to 12 hours.

It has been found that the higher the loading of copper, such as via copper source, in the wet chemical process, the better coverage is achieved on the palette flake. For instance, if the copper loading is too low, enough of the palette flake surface will not be encapsulated and the surface of the palette flake will be exposed and reflect electromagnetic radiation in the visible spectrum. Without being bound by any particular theory, when the concentration of copper is too low, the copper encapsulating the palette flake appears to form a mesh-like structure that has some porosity that may allow electromagnetic radiation in the visible spectrum to be reflected by the palette flake.

Accordingly, in embodiments, the amount of elemental copper on the encapsulated palette flake is greater than or equal to 30 wt % and less than or equal to 90 wt %, such as greater than or equal to 40 wt % and less than or equal to 90 wt %, greater than or equal to 50 wt % and less than or equal to 90 wt %, greater than or equal to 60 wt % and less than or equal to 90 wt %, greater than or equal to 70 wt % and less than or equal to 90 wt %, greater than or equal to 80 wt % and less than or equal to 90 wt %, greater than or equal to 30 wt % and less than or equal to 80 wt %, greater than or equal to 40 wt % and less than or equal to 80 wt %, greater than or equal to 50 wt % and less than or equal to 80 wt %, greater than or equal to 60 wt % and less than or equal to 80 wt %, greater than or equal to 70 wt % and less than or equal to 80 wt %, greater than or equal to 30 wt % and less than or equal to 70 wt %, greater than or equal to 40 wt % and less than or equal to 70 wt %, greater than or equal to 50 wt % and less than or equal to 70 wt %, greater than or equal to 60 wt % and less than or equal to 70 wt %, greater than or equal to 30 wt % and less than or equal to 60 wt %, greater than or equal to 40 wt % and less than or equal to 60 wt %, greater than or equal to 50 wt % and less than or equal to 60 wt %, greater than or equal to 30 wt % and less than or equal to 50 wt %, greater than or equal to 40 wt % and less than or equal to 50 wt %, or greater than or equal to 30 wt % and less than or equal to 40 wt %. The weight percent of the elemental copper in the encapsulated palette flake is calculated by measuring the mass of the palette flake (before it is encapsulated), then calculating the mass of elemental copper precipitated on the flake, and then dividing the mass of elemental copper precipitated on the flake by the sum of the mass of the palette flake and elemental copper precipitated on the palette flake.

Figure 3:
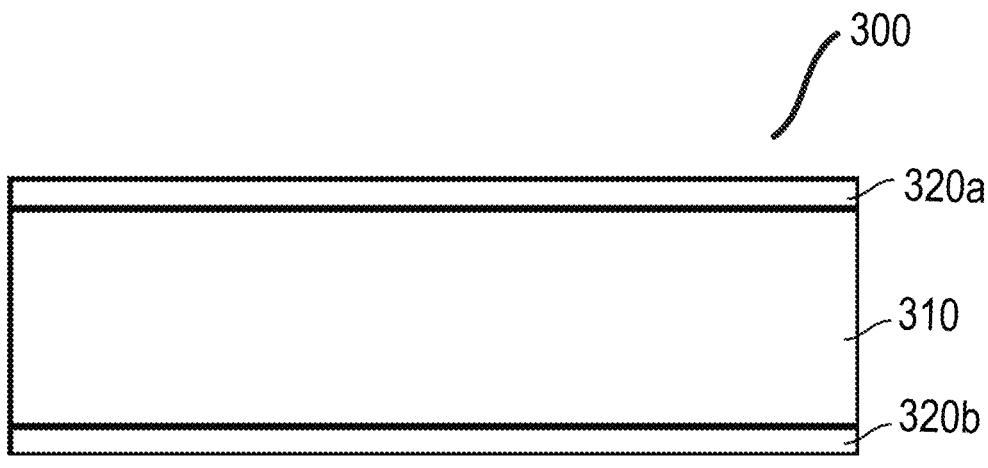
FIG. 3 schematically depicts an encapsulated palette flake.

Encapsulated palette flakes according to embodiments disclosed and described herein and formed by the methods disclosed and described herein have a structure as schematically depicted in FIG. 3. The encapsulated palette flake 300 has a palette flake 310 made from materials described above, such as $TiO_2$ coated glass palette flakes, $SiO_2$ coated glass palette flakes, or mica. The palette flake 310 has a first surface coated with a first copper oxide (CuO) layer 320*a* and a second surface coated with a second CuO layer 320*b*, which forms the encapsulated palette flake 300. In embodiments, the first surface of the palette flake and the second surface of the palette flake are surfaces of the palette flake that have a larger surface area than the other surfaces of the palette flake. The surface area of the first surface of the palette flake and the surface area of the second surface of the palette flake are approximately the same. Although not depicted in FIG. 3, embodiments may include a CuO layer on all sides of the palette flake 310.

In embodiments, the encapsulated palette flakes have a BET surface area that is from 10.0 $m^2$/g to 20.0 $m^2$/g, such as from 11.0 $m^2$/g to 20.0 $m^2$/g, from 12.0 $m^2$/g to 20.0 $m^2$/g, from 13.0 $m^2$/g to 20.0 $m^2$/g, from 14.0 $m^2$/g to 20.0 $m^2$/g, from 15.0 $m^2$/g to 20.0 $m^2$/g, from 16.0 $m^2$/g to 20.0 $m^2$/g, from 17.0 $m^2$/g to 20.0 $m^2$/g, from 18.0 $m^2$/g to 20.0 $m^2$/g, from 19.0 $m^2$/g to 20.0 $m^2$/g, from 10.0 $m^2$/g to 19.0 $m^2$/g, from 11.0 $m^2$/g to 19.0 $m^2$/g, from 12.0 $m^2$/g to 19.0 $m^2$/g, from 13.0 $m^2$/g to 19.0 $m^2$/g, from 14.0 $m^2$/g to 19.0 $m^2$/g, from 15.0 $m^2$/g to 19.0 $m^2$/g, from 16.0 $m^2$/g to 19.0 $m^2$/g, from 17.0 $m^2$/g to 19.0 $m^2$/g, from 18.0 $m^2$/g to 19.0 $m^2$/g, from 10.0 $m^2$/g to 18.0 $m^2$/g, from 11.0 $m^2$/g to 18.0 $m^2$/g, from 12.0 $m^2$/g to 18.0 $m^2$/g, from 13.0 $m^2$/g to 18.0 $m^2$/g, from 14.0 $m^2$/g to 18.0 $m^2$/g, from 15.0 $m^2$/g to 18.0 $m^2$/g, from 16.0 $m^2$/g to 18.0 $m^2$/g, from 17.0 $m^2$/g to 18.0 $m^2$/g, from 10.0 $m^2$/g to 17.0 $m^2$/g, from 11.0 $m^2$/g to 17.0 $m^2$/g, from 12.0 $m^2$/g to 17.0 $m^2$/g, from 13.0 $m^2$/g to 17.0 $m^2$/g, from 14.0 $m^2$/g to 17.0 $m^2$/g, from 15.0 $m^2$/g to 17.0 $m^2$/g, from 16.0 $m^2$/g to 17.0 $m^2$/g, from 10.0 $m^2$/g to 16.0 $m^2$/g, from 11.0 $m^2$/g to 16.0 $m^2$/g, from 12.0 $m^2$/g to 16.0 $m^2$/g, from 13.0 $m^2$/g to 16.0 $m^2$/g, from 14.0 $m^2$/g to 16.0 $m^2$/g, from 15.0 m²/g to 16.0 m²/g, from 10.0 m²/g to 15.0 m²/g, from 11.0 m²/g to 15.0 m²/g, from 12.0 m²/g to 15.0 m²/g, from 13.0 m²/g to 15.0 m²/g, from 14.0 m²/g to 15.0 m²/g, from 10.0 m²/g to 14.0 m²/g, from 11.0 m²/g to 14.0 m²/g, from 12.0 m²/g to 14.0 m²/g, from 13.0 m²/g to 14.0 m²/g, from 10.0 m²/g to 13.0 m²/g, from 11.0 m²/g to 13.0 m²/g, from 12.0 m²/g to 13.0 m²/g, from 10.0 m²/g to 12.0 m²/g, from 11.0 m²/g to 12.0 m²/g, or from 10.0 m²/g to 11.0 m²/g.

In one or more embodiments, the encapsulated palette flakes have a total pore volume (at $P/P_o$ approximately equal to 0.95) that is from 0.030 cm²/g to 0.050 cm²/g, such as from 0.032 cm²/g to 0.050 cm²/g, from 0.035 cm²/g to 0.050 cm²/g, from 0.037 cm²/g to 0.050 cm²/g, from 0.040 cm²/g to 0.050 cm²/g, from 0.042 cm²/g to 0.050 cm²/g, from 0.045 cm²/g to 0.050 cm²/g, from 0.047 cm²/g to 0.050 cm²/g, from 0.030 cm²/g to 0.047 cm²/g, from 0.032 cm²/g to 0.047 cm²/g, from 0.035 cm²/g to 0.047 cm²/g, from 0.037 cm²/g to 0.047 cm²/g, from 0.040 cm²/g to 0.047 cm²/g, from 0.042 cm²/g to 0.047 cm²/g, from 0.045 cm²/g to 0.047 cm²/g, from 0.030 cm²/g to 0.045 cm²/g, from 0.032 cm²/g to 0.045 cm²/g, from 0.035 cm²/g to 0.045 cm²/g, from 0.037 cm²/g to 0.045 cm²/g, from 0.040 cm²/g to 0.045 cm²/g, from 0.042 cm²/g to 0.045 cm²/g, from 0.030 cm²/g to 0.042 cm²/g, from 0.032 cm²/g to 0.042 cm²/g, from 0.035 cm²/g to 0.042 cm²/g, from 0.037 cm²/g to 0.042 cm²/g, from 0.040 cm²/g to 0.042 cm²/g, from 0.030 cm²/g to 0.040 cm²/g, from 0.032 cm²/g to 0.040 cm²/g, from 0.035 cm²/g to 0.040 cm²/g, from 0.037 cm²/g to 0.040 cm²/g, from 0.030 cm²/g to 0.037 cm²/g, from 0.032 cm²/g to 0.037 cm²/g, from 0.035 cm²/g to 0.037 cm²/g, from 0.030 cm²/g to 0.035 cm²/g, from 0.032 cm²/g to 0.035 cm²/g, or from 0.030 cm²/g to 0.032 cm²/g.

In embodiments, the encapsulated flake has an average pore diameter that is from 18.0 nm to 25.0 nm, such as from 19.0 nm to 25.0 nm, from 20.0 nm to 25.0 nm, from 21.0 nm to 25.0 nm, from 22.0 nm to 25.0 nm, from 23.0 nm to 25.0 nm, from 24.0 nm to 25.0 nm, from 18.0 nm to 24.0 nm, from 19.0 nm to 24.0 nm, from 20.0 nm to 24.0 nm, from 21.0 nm to 24.0 nm, from 22.0 nm to 24.0 nm, from 23.0 nm to 24.0 nm, from 18.0 nm to 23.0 nm, from 19.0 nm to 23.0 nm, from 20.0 nm to 23.0 nm, from 21.0 nm to 23.0 nm, from 22.0 nm to 23.0 nm, from 18.0 nm to 22.0 nm, from 19.0 nm to 22.0 nm, from 20.0 nm to 22.0 nm, from 21.0 nm to 22.0 nm, from 18.0 nm to 21.0 nm, from 19.0 nm to 21.0 nm, from 20.0 nm to 21.0 nm, from 18.0 nm to 20.0 nm, from 19.0 nm to 20.0 nm, or from 18.0 nm to 19.0 nm.

According to one or more embodiments, the encapsulated palette flake 300 has a blackness My that is greater than or equal to 110 and less than or equal to 140, such as greater than or equal to 115 and less than or equal to 140, greater than or equal to 120 and less than or equal to 140, greater than or equal to 125 and less than or equal to 140, greater than or equal to 130 and less than or equal to 140, greater than or equal to 135 and less than or equal to 140, greater than or equal to 110 and less than or equal to 135, greater than or equal to 115 and less than or equal to 135, greater than or equal to 120 and less than or equal to 135, greater than or equal to 125 and less than or equal to 135, greater than or equal to 130 and less than or equal to 135, greater than or equal to 110 and less than or equal to 130, greater than or equal to 115 and less than or equal to 130, greater than or equal to 120 and less than or equal to 130, greater than or equal to 125 and less than or equal to 130, greater than or equal to 110 and less than or equal to 125, greater than or equal to 115 and less than or equal to 125, greater than or equal to 120 and less than or equal to 125, greater than or equal to 110 and less than or equal to 120, greater than or equal to 115 and less than or equal to 120, or greater than or equal to 110 and less than or equal to 115.

Encapsulated palette flakes according to embodiments disclosed and described herein have a reflectivity in the visible spectrum of electromagnetic radiation that is less than or equal to 10.0%, such as less than or equal to 9.0%, less than or equal to 8.0%, less than or equal to 7.0%, less than or equal to 6.0%, less than or equal to 5.0%, less than or equal to 4.0%, less than or equal to 3.0%, less than or equal to 2.0%, less than or equal to 1.0%, or less than or equal to 0.5%.

Encapsulate palette flakes according to embodiments disclosed and described herein have a reflectivity in the near-IR and LiDAR spectrum of electromagnetic radiation that is between 10% and 90%, such as between 20% and 90%, between 30% and 90%, between 40% and 90%, between 50% and 90%, between 60% and 90%, between 70% and 90%, between 80% and 90%, between 10% and 80%, between 20% and 80%, between 30% and 80%, between 40% and 80%, between 50% and 80%, between 60% and 80%, between 70% and 80%, between 10% and 70%, between 20% and 70%, between 30% and 70%, between 40% and 70%, between 50% and 70%, between 60% and 70%, between 10% and 60%, between 20% and 60%, between 30% and 60%, between 40% and 60%, between 50% and 60%, between 10% and 50%, between 20% and 50%, between 30% and 50%, between 40% and 50%, between 10% and 40%, between 20% and 40%, between 30% and 40%, between 10% and 30%, between 20% and 30%, or between 10% and 20%.

Systems With Encapsulated Palette Flakes

Embodiments of a system having encapsulated palette flakes according to embodiments disclosed and described herein will now be described. According to embodiments, the system having encapsulated palette flakes may be a paint layer with a plurality of encapsulated palette flakes in a carrier. According to embodiments disclosed and described herein, the carrier may be a binder. Non-limiting examples of binders including enamel paint binders, urethane paint binders, and combination enamel-urethane paint binders. The system having encapsulated palette flakes appears as a dark color to an observer viewing the system having encapsulated palette flakes and reflects electromagnetic radiation in the near-IR and LiDAR spectrum, such as, for example, electromagnetic radiation with a wavelength from greater than about 750 nm to 1550 nm. That is, the near-IR and LiDAR reflecting system having encapsulated palette flakes, when exposed to sunlight and viewed by an observer, has a color with a lightness in CIELAB color space of less than or equal to 20 and reflects an average of more than 5% of electromagnetic radiation in the near-IR and LiDAR spectrum, such as electromagnetic radiation with a wavelength from greater than about 850 nm to 950 nm. In embodiments, the near-IR and LiDAR reflecting system having encapsulated palette flakes when exposed to sunlight reflects an average of less than 3% of electromagnetic radiation in the visible spectrum and has a lightness in CIELAB color space of less than or equal to 15. In such embodiments, the near-IR and LiDAR reflecting system having encapsulated palette flakes when exposed to sunlight may have a lightness in CIELAB color space of less than or equal to 10. As used herein, the term "average" refers to an average of ten (10) reflectance values equally distanced apart along a specified reflectance spectrum for a near-IR and LiDAR reflecting dark colored pigment or near-IR and LiDAR reflecting system having CuO encapsulated palette flakes 300 described herein. Also, the terms "reflects more than" and "reflects less than" as used herein refers to "reflects an average of more than" and "reflects an average or less than," respectively, unless otherwise stated.

Figure 4:
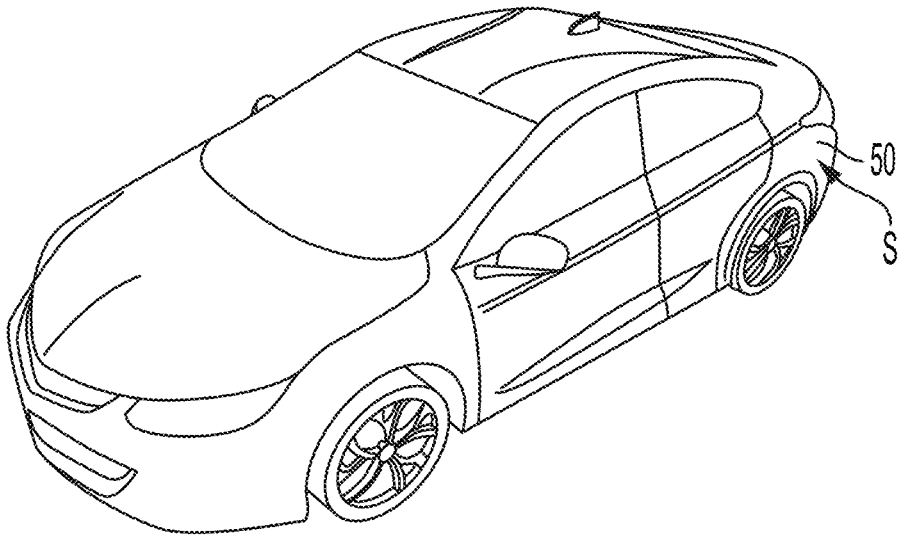
FIG. 4 schematically depicts a vehicle with side panels painted with a LiDAR reflecting dark colored paint.
Figure 5:
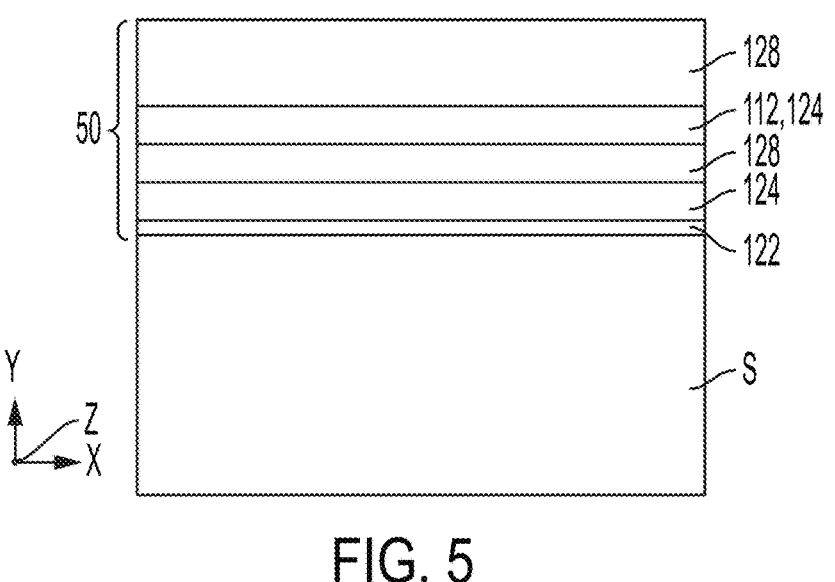
FIG. 5 schematically depicts a cross sectional view of a side panel painted with the LiDAR reflecting dark colored paint.

Referring now to FIGS. 4 and 5, embodiments of a vehicle 'V' painted with a near-IR and LiDAR reflecting dark colored paint having the encapsulated palette flakes disclosed and described herein are depicted. Particularly, FIG. 4 depicts the vehicle V with a side panel 'S' coated with a near-IR and LiDAR reflecting dark colored paint 50 comprising the encapsulated palette flakes disclosed and described herein, and FIG. 5 depicts a cross section of one of the side panel S with the near-IR and LiDAR reflecting dark colored paint 50. The near-IR and LiDAR reflecting dark colored paint 50 may include a plurality of layers that provide surface protection and a desired color. For example, the near-IR and LiDAR reflecting dark colored paint 50 may include a phosphate layer 122, an electrocoating layer 124, a primer layer 126, a color layer 112 or a color layer 114 (also known as a basecoat or basecoat layer) and a clear coat layer 128. Non-limiting examples of a phosphate layer include a manganese phosphate layer, an iron phosphate layer, a zinc phosphate layer, and combinations thereof. Non-limiting examples of an electrocoating layer include an anodic electrocoating layer and a cathodic electrocoating layer. Non-limiting examples of a primer layer include an epoxy primer layer and a urethane primer layer. Non-limiting examples of a clear coat layer include a urethane clear coat layer and an acrylic lacquer clear coat layer. It should be understood that the near-IR and LiDAR reflecting dark colored paint 50 appears as a dark color to an observer viewing the near-IR and LiDAR reflecting dark paint and reflects electromagnetic radiation in the near-IR and LiDAR spectrum, such as electromagnetic radiation with a wavelength of from greater than about 750 nm to 1550 nm. That is, the near-IR and LiDAR reflecting dark colored paint 50 exposed to sunlight and viewed by an observer has a color with lightness in CIELAB color space of less than or equal to 20 and reflects more than 40% of electromagnetic radiation in the near-IR and LiDAR spectrum, such as electromagnetic radiation with a wavelength from greater than about 750 nm to 1550 nm. In some embodiments, the near-IR and LiDAR reflecting dark colored paint 50 exposed to sunlight reflects an average of less than 10% of electromagnetic radiation in the visible spectrum and has a lightness in CIELAB color space of less than or equal to 15. In such embodiments, the LiDAR reflecting dark colored paint 50 exposed to sunlight may have a lightness in CIELAB color space of less than or equal to 10.

The blackness of a paint system having a clear coat may be lower than the blackness of the pigment itself. Without being bound by any particular theory it is believed that less light scattering from the smooth surface of the clear coat, or the less contrast in refractive index caused by the clear coat results in the lower blackness value. According to embodiments, a near-IR and LiDAR reflecting dark colored paint having the encapsulated palette flakes has a blackness greater than or equal to 120 and less than or equal to 140, such as greater than or equal to 122 and less than or equal to 140, greater than or equal to 124 and less than or equal to 140, greater than or equal to 126 and less than or equal to 140, greater than or equal to 128 and less than or equal to 140, greater than or equal to 130 and less than or equal to 140, greater than or equal to 132 and less than or equal to 140, greater than or equal to 134 and less than or equal to 140, greater than or equal to 136 and less than or equal to 140, greater than or equal to 138 and less than or equal to 140, greater than or equal to 120 and less than or equal to 138, greater than or equal to 122 and less than or equal to 138, greater than or equal to 124 and less than or equal to 138, greater than or equal to 126 and less than or equal to 138, greater than or equal to 128 and less than or equal to 138, greater than or equal to 130 and less than or equal to 138, greater than or equal to 132 and less than or equal to 138, greater than or equal to 134 and less than or equal to 138, greater than or equal to 136 and less than or equal to 138, greater than or equal to 120 and less than or equal to 136, greater than or equal to 122 and less than or equal to 136, greater than or equal to 124 and less than or equal to 136, greater than or equal to 126 and less than or equal to 136, greater than or equal to 128 and less than or equal to 136, greater than or equal to 130 and less than or equal to 136, greater than or equal to 132 and less than or equal to 136, greater than or equal to 134 and less than or equal to 136, greater than or equal to 120 and less than or equal to 134, greater than or equal to 122 and less than or equal to 134, greater than or equal to 124 and less than or equal to 134, greater than or equal to 126 and less than or equal to 134, greater than or equal to 128 and less than or equal to 134, greater than or equal to 130 and less than or equal to 134, greater than or equal to 132 and less than or equal to 134, greater than or equal to 120 and less than or equal to 132, greater than or equal to 122 and less than or equal to 132, greater than or equal to 124 and less than or equal to 132, greater than or equal to 126 and less than or equal to 132, greater than or equal to 128 and less than or equal to 132, greater than or equal to 130 and less than or equal to 132, greater than or equal to 120 and less than or equal to 130, greater than or equal to 122 and less than or equal to 130, greater than or equal to 124 and less than or equal to 130, greater than or equal to 126 and less than or equal to 130, greater than or equal to 128 and less than or equal to 130, greater than or equal to 120 and less than or equal to 128, greater than or equal to 122 and less than or equal to 128, greater than or equal to 124 and less than or equal to 128, greater than or equal to 126 and less than or equal to 128, greater than or equal to 120 and less than or equal to 126, greater than or equal to 122 and less than or equal to 126, greater than or equal to 124 and less than or equal to 126, greater than or equal to 120 and less than or equal to 124, greater than or equal to 122 and less than or equal to 124, or greater than or equal to 120 and less than or equal to 122.

As noted above near-IR and LiDAR reflecting encapsulated palette flakes according to embodiments disclosed and described herein may be used in paint to provide near-IR and LiDAR reflecting dark colored articles that can be detected with systems that detect near-IR or LiDAR electromagnetic radiation, such as electromagnetic radiation with a wavelength from greater than about 750 nm to 1550 nm. That is, articles desired to be detected by near-IR and LiDAR detection systems such as automobiles, motorcycles, bicycles, and the like, may be painted with a near-IR and LiDAR reflecting dark colored paint described herein and thereby provide a dark colored article with a desired dark color and yet be detectable by system that detects electromagnetic radiation in the near-IR and LiDAR spectrum, such as electromagnetic radiation with a wavelength from greater than about 750 nm to 1550 nm.

As would be understood from the foregoing, copper oxide crystallites according to embodiments disclosed and described herein offer an effective solution to replace traditional carbon black pigments in the future autonomous environment. Copper oxide crystallites show superior blackness in the visible region while keeping infrared reflectivity.

A first aspect includes an encapsulated palette flake comprising: a palette flake having a first surface and a second surface; and a layer on at least one of the first surface and the second surface, wherein a blackness My of the encapsulated palette flake is greater than or equal to 110 and less than or equal to 140, a reflectivity of the encapsulated palette flake in a visible spectrum of electromagnetic radiation is less than or equal to 10.0%, and a reflectivity of the encapsulated palette flake in a near-IR and LiDAR spectrum of electromagnetic radiation is between 10% and 90%.

A second aspect includes the encapsulated palette flake of the first aspect, wherein the encapsulated palette flake has a reflectivity of electromagnetic radiation in the visible spectrum that is less than or equal to 5%.

A third aspect includes the encapsulated palette flake of the first or second aspect, wherein the encapsulated palette flake has a reflectivity for electromagnetic radiation in the near-IR and LiDAR spectrum that is greater than or equal to 60%.

A fourth aspect includes the encapsulated palette flake of the first to third aspects, wherein the layer on at least one of the first surface and the second surface is copper oxide.

A fifth aspect includes the encapsulated palette flake of the first to fourth aspects, wherein the palette flake is selected from the group consisting of $TiO_2$ coated glass, $SiO_2$ coated glass, and mica.

A sixth aspect includes the encapsulated palette flake of the first to fifth aspects, wherein the blackness My of the encapsulated palette flake is greater than or equal to 125 and less than or equal to 140.

A seventh aspect includes the encapsulated palette flake of the first to sixth aspects, wherein the palette flake is selected from the group consisting of $TiO_2$ coated glass, $SiO_2$ coated glass, and mica, a copper oxide layer is present on both the first surface and the second surface of the palette flake, the blackness My of the encapsulated palette flake is greater than or equal to 125 and less than or equal to 140, the reflectivity of the encapsulated palette flake in the visible spectrum of electromagnetic radiation is less than or equal to 5.0%, and the reflectivity of the encapsulated palette flake in the near-IR and LiDAR spectrum of electromagnetic radiation is greater than or equal to 60%.

An eighth aspect includes a paint comprising: a paint binder; a plurality of encapsulated palette flakes according to any of the first to seventh aspects, wherein the paint has a color with a lightness in CIELAB color space less than or equal to 40.

A ninth aspect includes a vehicle comprising a body panel coated in the paint of the eighth aspect.

A tenth aspect includes, a method for forming an encapsulated palette flake comprising: combining a base solution comprising palette flakes and a precipitating agent with a solution comprising a copper source to form a precipitate; drying the precipitate, thereby obtaining dried precipitate; and calcining the dried precipitate to form encapsulated palette flakes, wherein the precipitating agent is selected from the group consisting of sodium hydroxide, sodium carbonate, and ammonium carbonate.

An eleventh aspect includes the method of the tenth aspect wherein the precipitating agent is sodium carbonate.

A twelfth aspect includes the method of the tenth or eleventh aspect, wherein the copper source is selected from the group consisting of copper nitrate, copper sulfate, copper chloride, and copper acetate.

A thirteenth aspect includes the method of the tenth to twelfth aspects, wherein the copper source is copper nitrate.

A fourteenth aspect includes the method of the tenth to thirteenth aspects, further comprising: forming a palette flake solution; forming an initial base solution; and combining the palette flake solution and the initial base solution to yield the base solution comprising the palette flakes.

A fifteenth aspect includes the method of the fourteenth aspect, wherein the palette flake solution comprises palette flakes at a concentration that is greater than or equal to 50 grams per liter (g/l) and less than or equal to 150 g/l.

A sixteenth aspect includes the method of the fourteenth or fifteenth aspects, wherein the base solution comprises a precipitating agent at a concentration that is greater than or equal to 50 g/l and less than or equal to 100 g/l.

A seventeenth aspect includes the method of the tenth to sixteenth aspects, wherein a concentration of copper nitrate in the solution comprising copper nitrate is greater than or equal to 100 g/l and less than or equal to 200 g/l.

An eighteenth aspect includes the method of the tenth to seventeenth aspects, wherein drying the precipitate comprises drying at a temperature greater than or equal to 100° C. and less than or equal to 150° C. for a duration greater than or equal to 2 hours.

A nineteenth aspect includes the method of the tenth to eighteenth aspects, wherein calcining the dried precipitate comprises calcining at a temperature greater than or equal to 200° C. and less than or equal to 500° C.

A twentieth aspect includes the method of the tenth to nineteenth aspects, wherein calcining the dried precipitate comprises calcining at a temperature greater than or equal to 300° C. and less than or equal to 450° C.

EXAMPLES

Embodiments will be further clarified by the following examples.

Palette flakes having a $TiO_2$ surface are encapsulated with copper oxide. Encapsulated palette flaks having 10 wt %, 20 wt %, and 30 wt % elemental copper as a percentage of the encapsulated palette flake (i.e., the palette flake and the copper) were synthesized via precipitation/deposition, filtration/washing, and drying plus calcination. The processes are outlined below.

10 wt % Copper Sample

For the 10 wt % copper sample, there were five main steps to the precipitation process.

Step 1) Preparation of the $TiO_2$ Flake Suspension.

To prepare the $TiO_2$ flake suspension, 0.4 g $TiO_2$ flakes were added to 3 mL water in a 20 mL vial with a "flea" stir bar.

Step 2) Preparation of Base Solution.

Separately, 0.25 g $Na_2CO_3$ was dissolved in 3 mL water in a 20 mL vial by vortex stirring (3000 rpm 1 min).

Step 3) Add base Solution to $TiO_2$ flake suspension by slowly stirring.

Step 4) Prepare Cu Nitrate Solution.

To prepare the copper nitrate solution 45 mg $Cu(NO_3)_2*2.5H_2O$ was loaded into a 20 mL vial, and 3 mL water was added to dissolve the $Cu(NO_3)_2$ with vortex stirring (3000 rpm 1 min).

Step 5)_Add Cu nitrate solution to the $TiO_2$ flake suspension and base solution composition via pipette, stirring for 1 hr. and then aging for 12 hrs.

20 wt % Copper Sample

For 20 wt % Copper, there were five main steps to the precipitation process.

Step 1) Preparation of TiO$_2$ Flake Suspension.

To prepare the TiO$_2$ flake suspension, 0.4 g TiO$_2$ flakes were added to 3 mL water in a 20 mL vial with a "flea" stir bar.

Step 2) Preparation of Base Solution.

Separately, 0.25 g Na$_2$CO$_3$ was dissolved in 3 mL water in a 20 mL vial by vortex stirring (3000 rpm 1 min).

Step 3) Add base solution to TiO$_2$ flake suspension by slowly stirring.

Step 4) Prepare Cu Nitrate Solution.

To prepare the copper nitrate solution 100 mg Cu(NO$_3$)$_2$*2.5H$_2$O was loaded into a 20 mL vial, and 3 mL water was added to dissolve the Cu(NO$_3$)$_2$ with vortex stirring (3000 rpm 1 min).

Step 5) Add Cu nitrate solution to the TiO$_2$ flake suspension and base solution composition via pipette, stirring for 1 hr. and then aging for 12 hrs.

30 wt % Copper Sample

For 30 wt % Copper, the synthesis was altered to utilize a dual syringe pump. The dual syringe pump allowed for a more homogeneous copper-containing precursor, due to addition of the copper nitrate and sodium carbonate solutions simultaneously at low rates of addition.

Step 1) Preparation of TiO$_2$ Flake Suspension.

To prepare the TiO$_2$ flake suspension, 2.1 g TiO$_2$ flakes were added to 24 mL water in a 100 mL beaker under continuous magnetic stirring.

Step 2) Preparation of Base and Nitrate Solution.

Approximately 1.75 g Na$_2$CO$_3$ was dissolved in 20 mL water, and placed into syringe.

Step 3) Preparation of Nitrate Solution.

2.632 g copper nitrate was dissolved in 20 mL water, and placed into syringe.

Step 4) To the stirring TiO$_2$ flake suspension, 6 mL/hr of the solutions were added with an electronically controlled dual syringe pump.

Step 5) the composition was stirred for 1 hr. then aged for 12 hrs.

Collecting, Drying, and Calcining

Precipitate from each of the samples was collected via vacuum filtration and washed with 50 ml of deionized water. The collected precipitate was then dried at 120° C. for a duration of 12 hours at a 2° C. per minute ramp rate. The dried precipitate was ground with a mortar and pestle.

The 10 wt % sample, the 20 wt % sample, and a portion of the 30 wt % sample were calcined at 300° ° C. for a duration of 3 hours at a ramp rate of 5° C. per minute and returned to ambient temperature naturally.

In addition to the above calcination, two additional portions of the 30 wt % sample were calcined at 400° C. for a duration of 3 hours at a ramp rate of 5° ° C. per minute, and calcined at 450° C. for a duration of 3 hours at a ramp rate of 5° C. per minute, respectively.

Figure 6A:
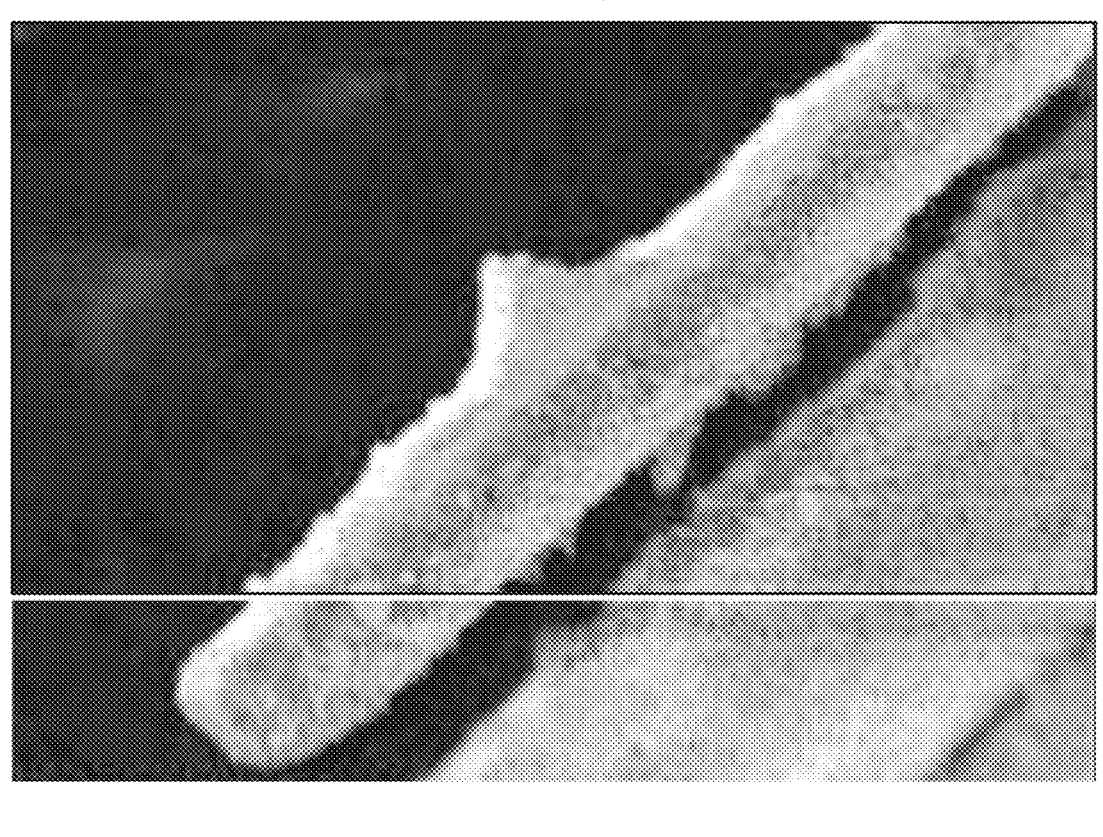
FIG. 6A is an FE-SEM image of an encapsulated palette flake with 10 wt % copper oxide mapped to multiple elements.
Figure 6B:
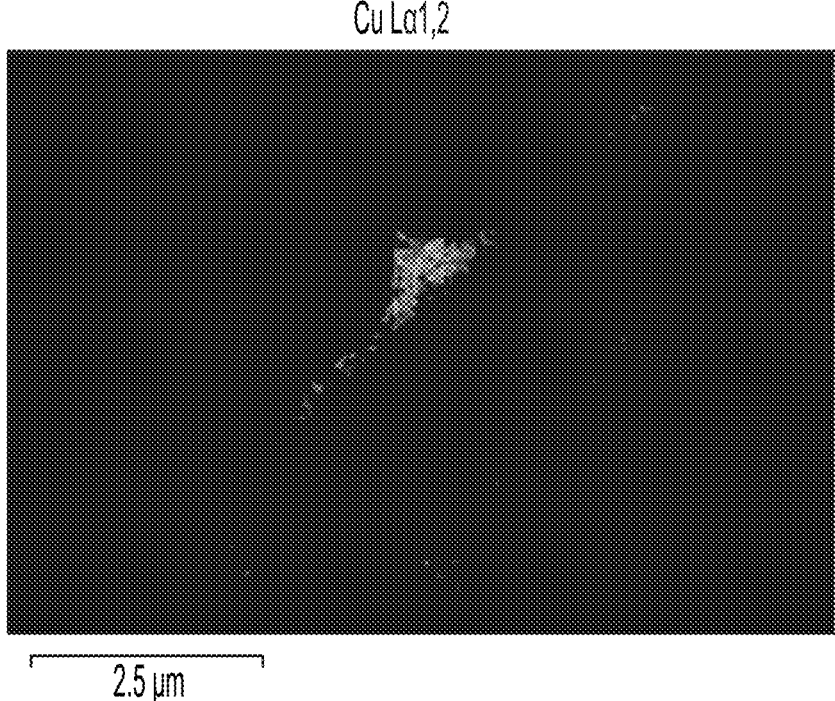
FIG. 6B is an FE-SEM image of an encapsulated palette flake with 10 wt % copper oxide mapped to copper oxide only.

FIG. 6A is a FE-SEM image of the 10 wt % sample with a map for all elements and FIG. 6B is an FE-SEM image of the 10 wt % sample with a map of only Cu. These figures show that at significant amount of TiO$_2$ is still present at the exposed surface of the encapsulated palette flake, which indicates that the loading of copper was not sufficient to fully encapsulate the TiO$_2$ palette flake.

Figure 7A:
FIG. 7A is an FE-SEM image of an encapsulated palette flake with 20 wt % copper oxide mapped to multiple elements.
Figure 7B:
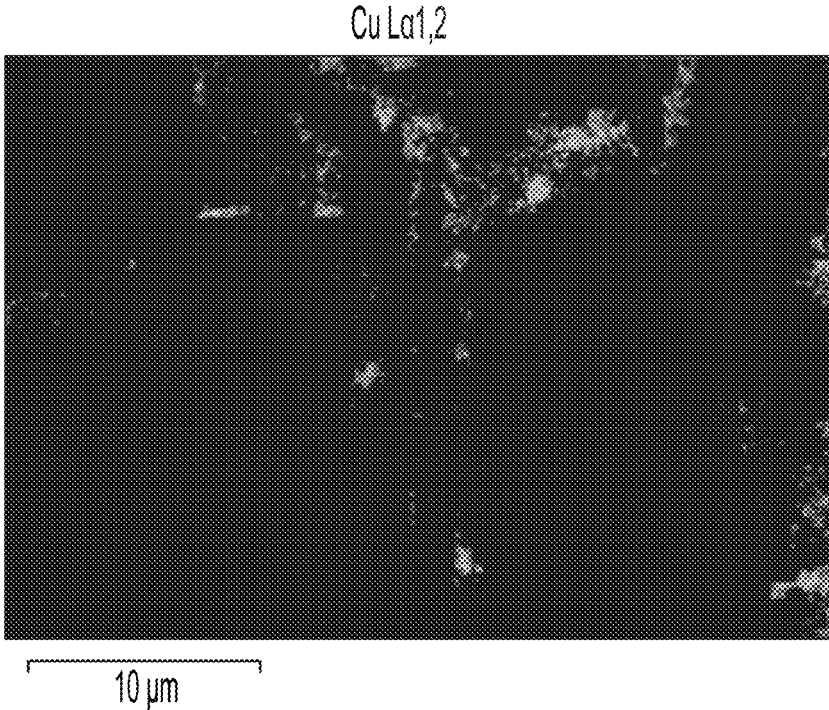
FIG. 7B is an FE-SEM image of an encapsulated palette flake with 20 wt % copper oxide mapped to copper oxide only.

FIG. 7A is a FE-SEM image of the 20 wt % sample with a map for all elements and FIG. 7B is an FE-SEM image of the 20 wt % sample with a map of only Cu. These figures show that at an amount of TiO$_2$ is still present at the exposed surface of the encapsulated palette flake, which indicates that the loading of copper was not sufficient to fully encapsulate the TiO$_2$ palette flake.

Figure 8:
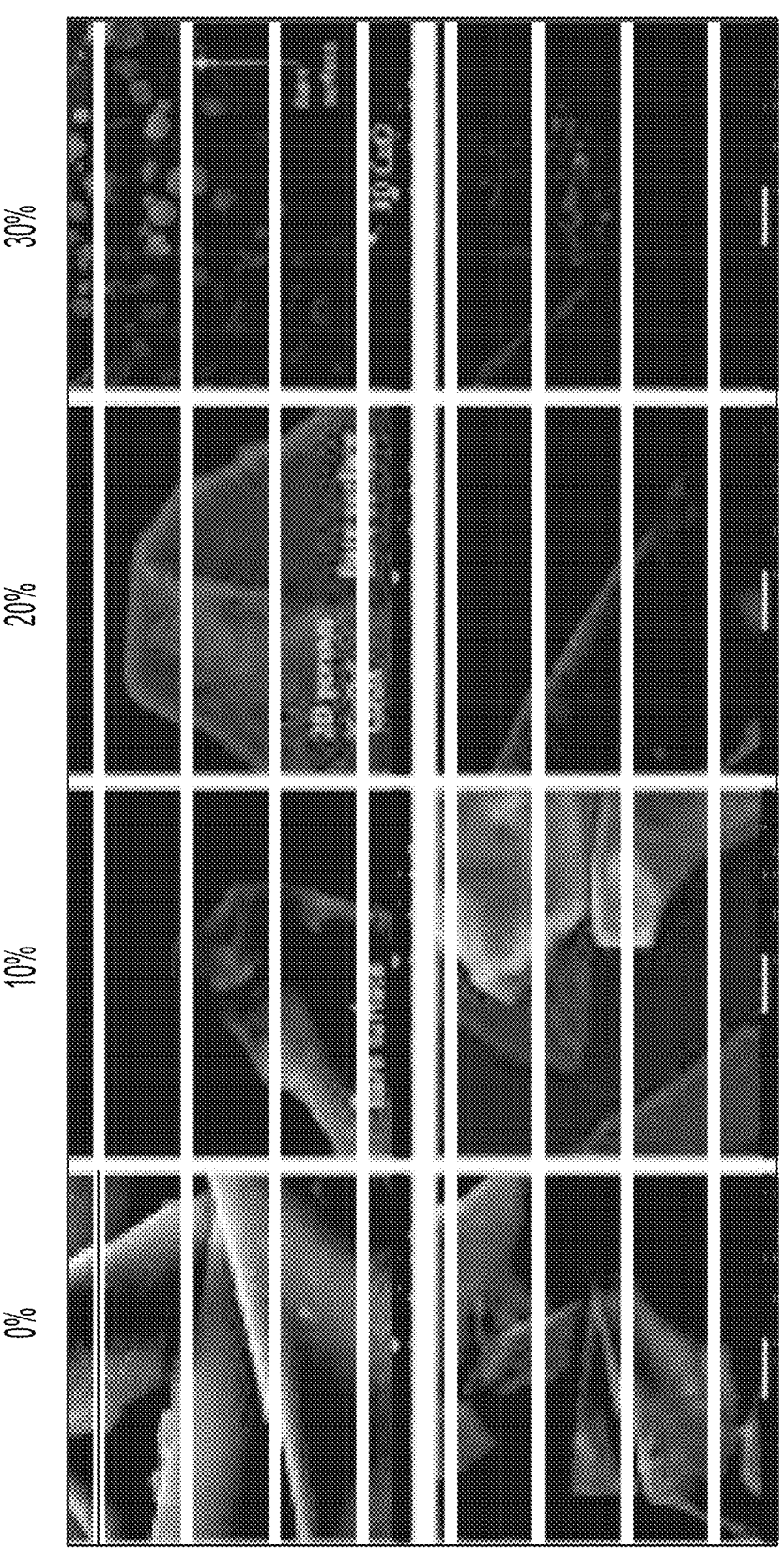
FIG. 8 is includes SEM images of bare $TiO_2$ palette flakes, palette flakes encapsulated with 10 wt % copper oxide, palette flakes encapsulated with 20 wt % copper oxide, and palette flakes encapsulated with 30 wt % copper oxide.

FIG. 8 is an SEM image comparison of a bare TiO$_2$ flake (0% in FIG. 8), the 10 wt % sample, the 20 wt % sample, and the 30 wt % sample. The copper in the 10 wt % and 20 wt % samples appears as a mesh-like structure with some porosity that could provide a pathway for light to the TiO$_2$ palette flake and, thereby, reflect light from the encapsulated palette flake. However, the 30 wt % sample has more of a spherical copper structure on the surface of its TiO$_2$ palette flake and has a more clear 3-dimensional secondary structure displaying good coverage on the surface of the TiO$_2$ palette flake.

Figure 9:
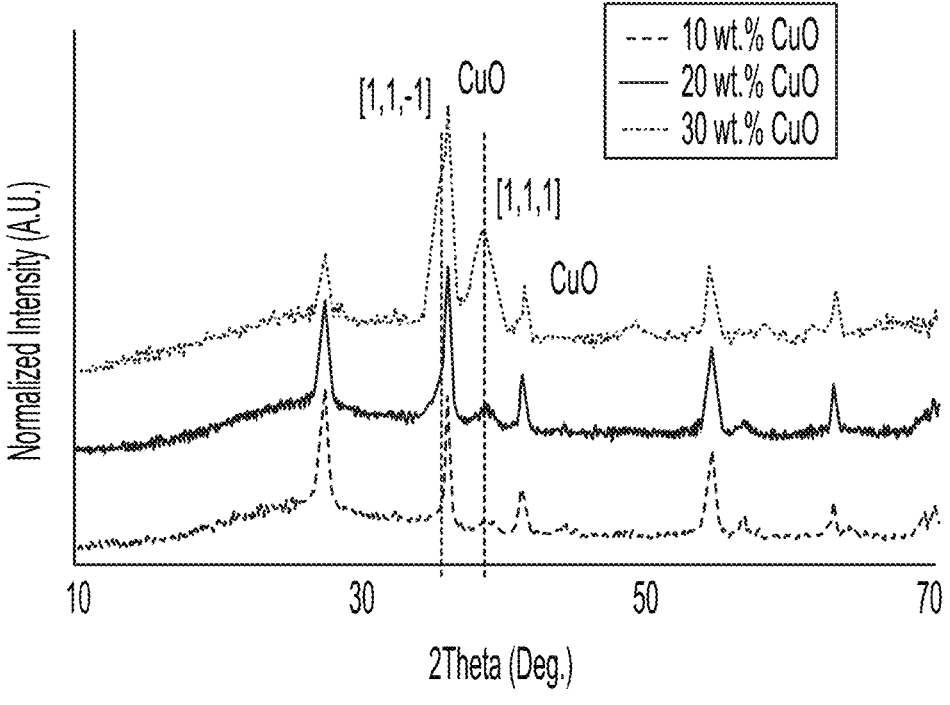
FIG. 9 is an XRD graph of a $TiO_2$ palette flake encapsulated with 10 wt % copper oxide, $TiO_2$ palette flake encapsulated with 20 wt % copper oxide, and $TiO_2$ palette flake encapsulated with 30 wt % copper oxide.

FIG. 9 is an XRD display of the diffraction patterns of the 10 wt % and 20 wt % samples, which only contain peaks ascribed to the TiO$_2$ palette flake. Without being bound by any particular theory, there may be some detectable CuO tenorite phase in the XRD patterns, and this possibly explains why the samples were not as black as the 30 wt % sample, which clearly contain peaks assigned to CuO tenorite phase. The XRD data support the observations from SEM. For most supports, 10 wt % or 20 wt % of copper is sufficient to detect CuO phase in the diffraction patterns, including TiO$_2$ supports, so this is a surprising result that is likely a result of the unique precipitation deposition synthesis utilized.

Figures 10A, 10B:
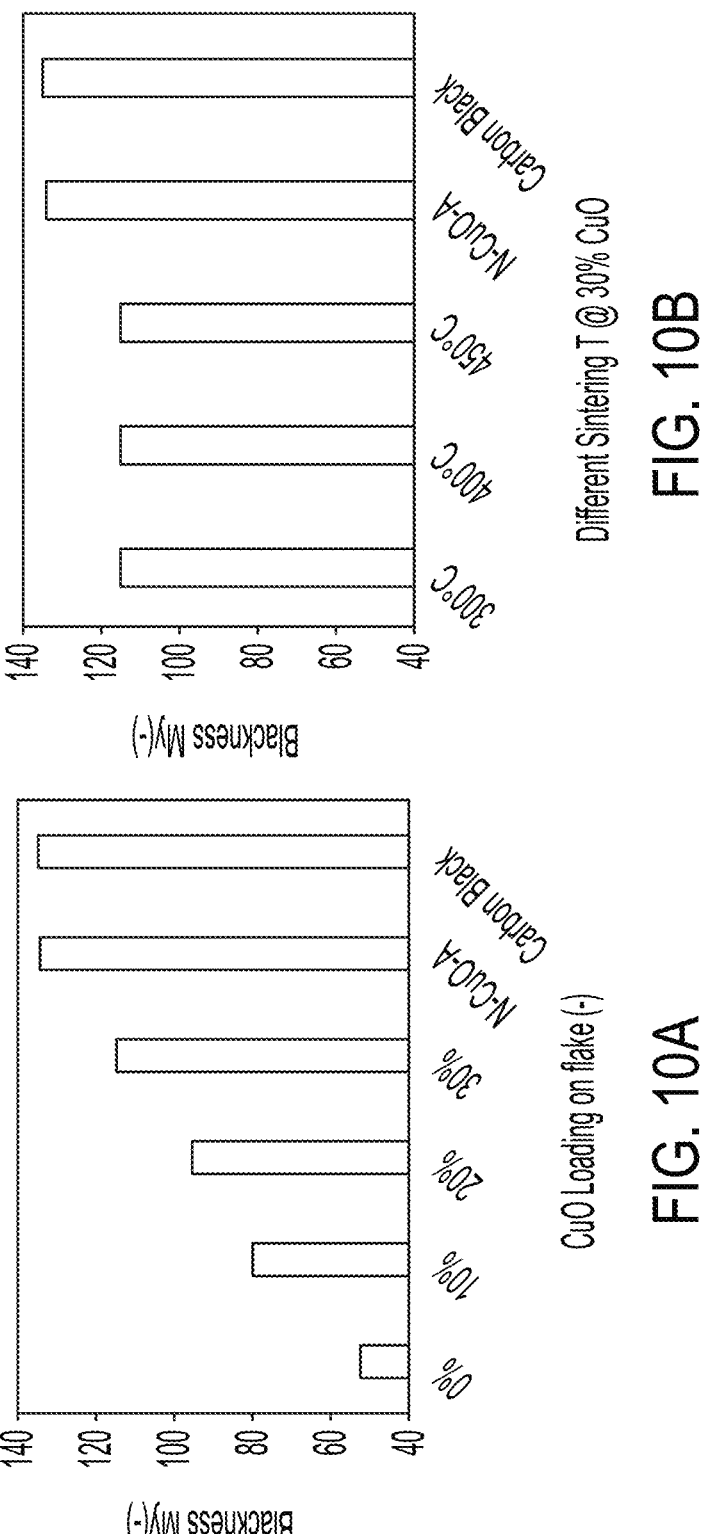
FIG. 10A is a bar graph showing the blackness of a bare $TiO_2$ palette flake, a $TiO_2$ palette flake encapsulated with 10 wt % copper oxide, $TiO_2$ palette flake encapsulated with 20 wt % copper oxide, a $TiO_2$ palette flake encapsulated with 30 wt % copper oxide, copper oxide particles, and carbon black.
FIG. 10B is a bar graph showing the blackness of a $TiO_2$ palette flake encapsulated with 30 wt % copper oxide that has been calcined at 300° ° C., 400° C., and 450° C., copper oxide particles, and carbon black.

FIG. 10A is a bar graph showing the blackness of a bare TiO$_2$ flake (0% in FIG. 10), the 10 wt % sample, the 20 wt % sample, the 30 wt % sample, N—CuO-A particles, and carbon black. As shown in FIG. 10A the 30 wt % sample has a blackness level nearing that of N—CuO-A and carbon black particles. The degree of blackness My of painted samples was evaluated by X-Rite Ci7600 benchtop spectrophotometer (USA, X-Rite) that directly related to the reference provided by the instrument.

$$M_Y = 100\log(Y_n/Y)$$

Where Y$_n$=100.000 is one of the CIE White Point values for D65/10 conditions. Y are one of the CIE tristimulus values for the sample being measured.

FIG. 10B is a bar graph showing the blackness of 30 wt % samples calcined at 300° C., calcined at 400° C., and calcined at 450° C. compared to the blackness of N—CuO-A and carbon black. As shown in FIG. 10B, the calcination temperature does not have an effect on the blackness of the 30 wt % sample.

Figure 11:
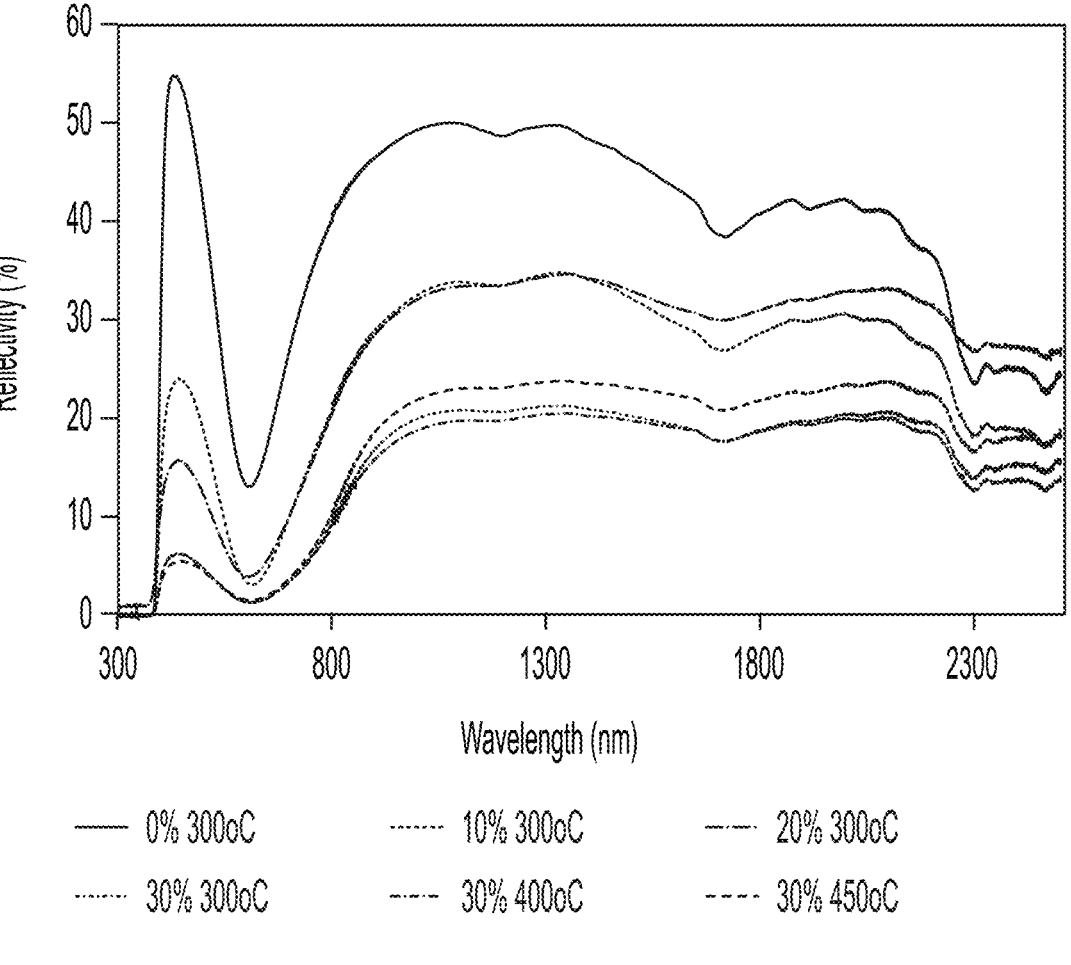
FIG. 11 is a graph showing the reflectivity of a non-encapsulated $TiO_2$ palette flake, an encapsulated $TiO_2$ palette flake with 10 wt % copper, an encapsulated $TiO_2$ palette flake with 20 wt % copper, and an encapsulated $TiO_2$ palette flake with 30 wt % copper that has been calcined at 300° C., 400° C., and 450° C.

Similarly, FIG. 11 shows the reflectivity of a non-encapsulated palette flake (0% in FIG. 11), an encapsulated palette flakes having a 10 wt % copper, an encapsulated palette flake having a 20 wt % copper, and encapsulated palette flakes having 20 wt % copper that were calcined at 300° C., 400° C., and 450° ° C. As shown in FIG. 11, the reflectivity of electromagnetic radiation in the visible spectrum dropped as the wt % of copper in the encapsulated palette flake increased, and the reflectivity of electromagnetic radiation in the LiDAR and near-IR spectrums remained relatively high. Moreover, FIG. 11 shows that the calcination temperature does not have a significant effect on the encapsulated palette flakes having 30 wt % copper.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An encapsulated palette flake comprising:
a palette flake having a first surface and a second surface; and
a layer on at least one of the first surface and the second surface, wherein
a blackness My of the encapsulated palette flake is greater than or equal to 110 and less than or equal to 140,
a reflectivity of the encapsulated palette flake in a visible spectrum of electromagnetic radiation is less than or equal to 10.0%, and
a reflectivity of the encapsulated palette flake in a near-IR and LiDAR spectrum of electromagnetic radiation is between 10% and 90%.

2. The encapsulated palette flake of claim 1, wherein the encapsulated palette flake has a reflectivity of electromagnetic radiation in the visible spectrum that is less than or equal to 5%.

3. The encapsulated palette flake of claim 1, wherein the encapsulated palette flake has a reflectivity for electromagnetic radiation in the near-IR and LiDAR spectrum that is between 60% and 90%.

4. The encapsulated palette flake of claim 1, wherein the layer on at least one of the first surface and the second surface is copper oxide.

5. The encapsulated palette flake of claim 1, wherein the palette flake is selected from the group consisting of $TiO_2$ coated glass, $SiO_2$ coated glass, and mica.

6. The encapsulated palette flake of claim 1, wherein the blackness My of the encapsulated palette flake is greater than or equal to 125 and less than or equal to 140.

7. The encapsulated palette flake of claim 1, wherein
the palette flake is selected from the group consisting of $TiO_2$ coated glass, $SiO_2$ coated glass, and mica,
a copper oxide layer is present on both the first surface and the second surface of the palette flake,
the blackness My of the encapsulated palette flake is greater than or equal to 125 and less than or equal to 140,
the reflectivity of the encapsulated palette flake in the visible spectrum of electromagnetic radiation is less than or equal to 5.0%, and
the reflectivity of the encapsulated palette flake in the near-IR and LiDAR spectrum of electromagnetic radiation is between 60% and 90%.

8. A paint comprising:
a paint binder;
a plurality of encapsulated palette flakes according to claim 1, wherein the paint has a color with a lightness in CIELAB color space less than or equal to 40.

9. A vehicle comprising a body panel coated in the paint of claim 8.

10. A method for forming the encapsulated palette flake according to claim 1 comprising:
combining a base solution comprising palette flakes and a precipitating agent with a solution comprising a copper source to form a precipitate;
drying the precipitate, thereby obtaining dried precipitate; and
calcining the dried precipitate to form encapsulated palette flakes, wherein
the precipitating agent is selected from the group consisting of sodium hydroxide, sodium carbonate, and ammonium carbonate.

11. The method of claim 10, wherein the precipitating agent is sodium carbonate.

12. The method of claim 10, wherein the copper source is selected from the group consisting of copper nitrate, copper sulfate, copper chloride, and copper acetate.

13. The method of claim 10, wherein the copper source is copper nitrate.

14. The method of claim 10, further comprising:
forming a palette flake solution;
forming an initial base solution; and
combining the palette flake solution and the initial base solution to yield the base solution comprising the palette flakes.

15. The method of claim 14, wherein the palette flake solution comprises palette flakes at a concentration that is greater than or equal to 50 grams per liter (g/l) and less than or equal to 150 g/l.

16. The method of claim 14, wherein the base solution comprises the precipitating agent at a concentration that is greater than or equal to 50 g/l and less than or equal to 100 g/l.

17. The method of claim 13, wherein a concentration of the copper nitrate in the solution comprising a copper source is greater than or equal to 100 g/l and less than or equal to 200 g/l.

18. The method of claim 10, wherein drying the precipitate comprises drying at a temperature greater than or equal to 100° C. and less than or equal to 150° C. for a duration greater than or equal to 2 hours.

19. The method of claim 10, wherein calcining the dried precipitate comprises calcining at a temperature greater than or equal to 200° C. and less than or equal to 500° C.

20. The method of claim 10, wherein calcining the dried precipitate comprises calcining at a temperature greater than or equal to 300° C. and less than or equal to 450° C.

* * * * *